(12) United States Patent
Sayeedi

(10) Patent No.: US 9,301,203 B2
(45) Date of Patent: Mar. 29, 2016

(54) METHOD, APPARATUS, COMPUTER PROGRAM PRODUCT AND SYSTEM FOR IDENTIFYING, MANAGING AND TRACKING CONGESTION

(71) Applicant: NOKIA SIEMENS NETWORKS OY, Espoo (FI)

(72) Inventor: Shahab Sayeedi, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 61 days.

(21) Appl. No.: 14/018,110

(22) Filed: Sep. 4, 2013

(65) Prior Publication Data
US 2014/0064073 A1 Mar. 6, 2014

Related U.S. Application Data

(60) Provisional application No. 61/696,609, filed on Sep. 4, 2012.

(51) Int. Cl.
| | |
|---|---|
| *H04J 1/16* | (2006.01) |
| *H04W 4/00* | (2009.01) |
| *H04W 74/00* | (2009.01) |
| *H04W 28/12* | (2009.01) |
| *H04L 12/801* | (2013.01) |
| *H04L 12/825* | (2013.01) |

(52) U.S. Cl.
CPC .............. *H04W 28/12* (2013.01); *H04L 47/11* (2013.01); *H04L 47/12* (2013.01); *H04L 47/26* (2013.01)

(58) Field of Classification Search
CPC ...... H04W 48/06; H04W 24/08; H04L 47/10; H04L 47/14; H04L 47/266
See application file for complete search history.

(56) References Cited

U.S. PATENT DOCUMENTS

| | | | |
|---|---|---|---|
| 2005/0157646 A1* | 7/2005 | Addagatla et al. | 370/232 |
| 2006/0007862 A1* | 1/2006 | Sayeedi et al. | 370/235 |
| 2006/0126509 A1* | 6/2006 | Abi-Nassif et al. | 370/235 |
| 2006/0176810 A1 | 8/2006 | Kekki | |
| 2007/0036079 A1* | 2/2007 | Chowdury et al. | 370/235 |
| 2010/0002579 A1 | 1/2010 | Shi et al. | |
| 2011/0235528 A1 | 9/2011 | Racz et al. | |
| 2011/0261695 A1 | 10/2011 | Zhao et al. | |
| 2012/0263036 A1* | 10/2012 | Barclay et al. | 370/230 |

(Continued)

FOREIGN PATENT DOCUMENTS

| | | |
|---|---|---|
| EP | 1 906 589 A1 | 4/2008 |
| EP | 1 936 880 A1 | 6/2008 |

(Continued)

OTHER PUBLICATIONS

International Search Report application No. PCT/EP2013/068151 dated Jan. 7, 2014.

(Continued)

*Primary Examiner* — Melanie Jagannathan
(74) *Attorney, Agent, or Firm* — Squire Patton Boggs (US) LLP

(57) ABSTRACT

Various communication systems may benefit from congestion management. For example, code division multiple access wireless networks may benefit from identifying and tracking of congestion. A method may include identifying a cause of actual or potential congestion. The method may also include notifying a radio access network regarding the cause of actual or potential congestion.

26 Claims, 11 Drawing Sheets

(56) References Cited

U.S. PATENT DOCUMENTS

| | | | |
|---|---|---|---|
| 2013/0021904 A1* | 1/2013 | Dolan et al. | 370/230 |
| 2013/0051332 A1* | 2/2013 | Sridhar | 370/329 |
| 2013/0135998 A1 | 5/2013 | Sayeedi | |
| 2013/0194919 A1* | 8/2013 | Garavaglia et al. | 370/229 |
| 2013/0242741 A1* | 9/2013 | Ozawa | 370/235 |
| 2014/0016460 A1* | 1/2014 | Nadas et al. | 370/230 |

FOREIGN PATENT DOCUMENTS

| | | |
|---|---|---|
| EP | 2 101 525 A1 | 9/2009 |
| EP | 2 273 737 A1 | 1/2011 |
| WO | 99/49678 A1 | 9/1999 |

OTHER PUBLICATIONS

3GPP TR 23.888 V1.5.0; "3'd Generation Partnership Project; Technical Specification Group Services and System Aspects; System Improvements for Machine-Type Communications; (Release 11)"; Oct. 2011; Chapters 6.23.2-6.23.4 (pp. 69¬72).

Alcatel-Lucent; "Clarification on overload control of low priority access"; 3GPP TD S2-103105; 3GPP TSG SA WG2 Meeting #79E (Electronic); Jul. 6-13, 2010; Elbonia; whole document (3 pages).

Nokia Siemens Networks; "Criteria of Detchment/Deactivation for Congestion Control"; 3GPP TD S2-103154; 3GPP TSG SA WG2 Meeting #79E (Electronic); Jul. 6-13, 2010; Elbonia; whole document (4 pages).

3GPP TR 23.843 V0.4.0; "3' Generation Partnership Project; Technical Specification Group Services and System Aspects; Study on Core Network Overload Solutions; (Release 11)"; Apr. 2011; whole document (19 pages).

"Interoperability Specification (I0S) for High Rate Packet Data (HRPD) Radio Access Network Interfaces with Session Control in the Access Network", 3GPP2 A.S0008-C v4.0, Apr. 2011, (708 pages).

Interoperability Specification (I0S) for cdma2000 access Network Interfaces—Part 7 (A 10 and A 11 Interfaces), (3G-10S v5.1.2), 3GPP2 A.S0017-D v3.0, May 2011, (80 pages).

"Interoperability Specification (I0S) for High Rate Packet Data (HRPD) Radio Access Network Interfaces with Session Control in the Access Network", 3GPP2 A.S0009-C v4.0, Apr. 2011, (896 pages).

3GPP2 A.S0017-D v3.0, "Interoperability Specification (IOS) for cdma2000 Access network Interfaces—Part 7 (A10 and All Interfaces)", 3rd Generation Partnership Project 2 "3GPP2", (3G-IOS v5.1.2), May 2011, 82 pages.

3GPP2 A.S0022-A v1.0, "Interoperability Specification (IOS) for Evolved High Rate Packet Data (eHRPD) Radio Access Network Interfaces and Interworking with Enhanced Universal Terrestrial Radio Access Network (E-UTRAN)", 3rd Generation Partnership Project 2 "3GPP2", Feb. 2011, 226 pages.

\* cited by examiner

METHOD, APPARATUS, COMPUTER PROGRAM PRODUCT AND SYSTEM FOR IDENTIFYING, MANAGING AND TRACKING CONGESTION

CROSS-REFERENCE TO RELATED APPLICATION

The present application is related to and claims the benefit and priority of U.S. Provisional Patent Application No. 61/696,609, filed Sep. 4, 2012, the entirety of which is hereby incorporated herein by reference.

BACKGROUND

1. Field

Various communication systems may benefit from congestion management. For example, code division multiple access wireless networks may benefit from identifying and tracking of congestion.

2. Description of the Related Art

Growing traffic, like for example, smartphone traffic and machine to machine (M2M) device traffic, is expected to strain currently deployed core networks leading to the need for congestion relief Conventional standards, however, do not provide a reliable way for radio access network (RAN) operators to determine when core network congestion is occurring, for example before a network failure occurs. Conventionally, mobile internet protocol (MIP) registration release signaling over A11 is used to gracefully release packet data sessions. Upon receiving an A11 registration request message containing the lifetime field set to 0, the packet data serving node (PDSN)/high rate packet data (HRPD) serving gateway (HSGW) can send an A11 registration reply message containing a 'code' field set to 'registration accepted'. The RAN currently stores the MIP registration failure codes which are later downloaded by operators to detect any potential problems in the network. However, when sessions are gracefully released due to core network congestion there is no way for an operator of a RAN to determine this.

Another conventional method that gracefully releases existing packet sessions can comprise the A11 registration update message, which triggers A11 MIP registration signaling to release the session. While the A11 update message does comprise a cause code, it is not used when the A11 notification message is sent. The A11 notification message may be used to initiate the release of multiple sessions at the PDSN/HSGW based on priority levels whereas the A11 registration update signaling conventionally must be sent for each packet data session making it inefficient for congestion relief control. An A11 notification sent by the PDSN can trigger the RAN to release the session. The PCF can then compare priorities before initiating session release.

Moreover when packet sessions are ungracefully released due to serious core network congestion, or incoming sessions initiated by a user equipment (UE) are blocked by the RAN before the session can be created, no failure codes comprising registration codes are generated.

SUMMARY

According to certain embodiments, a method can include identifying a cause of actual or potential congestion. The method can also include notifying a radio access network regarding the cause of actual or potential congestion.

In a variant, the method can be performed in a core network element.

In a variant, the actual or potential congestion can be a core network element congestion.

In a variant, the notifying can include sending a message comprising a cause code.

In a variant, the message can be an A11-Notify message or an A11-Registration reply message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the notifying can include notifying a packet control function located in the radio access network.

Each of the above variants can be combined with one another.

According to certain embodiments, a method can include receiving a notification of a cause of actual or potential congestion. The method can also include taking action with respect to at least one session based on the notification.

In a variant, the actual or potential congestion can be a core network congestion.

In a variant, the method can be performed in a first radio access network element.

In a variant, the first radio access network element can be a packet control function.

In a variant, the receiving can include receiving a first message comprising a cause code.

In a variant, the first message can be an A11-Notify message or an A11-Registration reply message.

In a variant, the method can include transmitting the cause code and the action to be taken in a second message to a second radio access network element.

In a variant, the second message can be an A9-Release-A8-Complete message or an A9-Disconnect-A8 message or an A9-Update-A8 message.

In a variant, the second radio access network element can be one of an access network and a base station.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release and inter-PDSN-handover and ungraceful A8 release and rejecting a new session setup.

In a variant, the action can depend on the cause of actual or potential congestion or on assigned priority values or both.

Each of the above variants can be combined with one another.

According to certain embodiments, a method can include receiving an identification of an action to be taken with respect to at least one session and a notification of a cause for the action.

In a variant, the cause of the action can be an actual or potential network congestion.

In a variant, the actual or potential congestion can be a core network congestion.

In a variant, the method can be performed in a radio access network element.

In a variant, the radio access network element can be one of an access network and a base station.

In a variant, the receiving can include receiving a message that includes a cause code.

In a variant, the message can be an A9-Release-A8-Complete message or an A9-Disconnect-A8 message or an A9-Update-A8 message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release, inter-PDSN-handover, ungraceful A8 release, or rejecting a new session setup.

In a variant, the action can depend on the cause of actual or potential congestion or on assigned priority values or both.

In a variant, the method can include generating statistics based on the action, wherein the action is pegged to the cause in the statistics.

In a variant, the statistics can differentiate between core network reasons for decongestive actions and radio access network reasons for decongestive actions.

Each of the above variants can be combined with one another.

According to certain embodiments, an apparatus can include identifying means for identifying a cause of actual or potential congestion. The apparatus can also include notifying means for notifying a radio access network regarding the cause of actual or potential congestion.

In a variant, the apparatus can include a core network element.

In a variant, the actual or potential congestion can be a core network element congestion.

In a variant, the notifying can include sending a message comprising a cause code.

In a variant, the message can be an A11-Notify message or an A11-Registration reply message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the notifying can include notifying a packet control function located in the radio access network.

Each of the above variants can be combined with one another.

According to certain embodiments, an apparatus can include receiving means for receiving a notification of a cause of actual or potential congestion. The apparatus also includes decongesting means for taking action with respect to at least one session based on the notification.

In a variant, the actual or potential congestion can be a core network congestion.

In a variant, the apparatus can be a first radio access network element.

In a variant, the first radio access network element can be a packet control function.

In a variant, the receiving can include receiving a first message comprising a cause code.

In a variant, the first message can be an A11-Notify message or an A11-Registration reply message.

In a variant, the apparatus can also include transmitting means for transmitting the cause code and the action to be taken in a second message to a second radio access network element.

In a variant, the second message can be an A9-Release-A8-Complete message or an A9-Disconnect-A8 message or an A9-Update-A8 message.

In a variant, the second radio access network element can be an access point.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release, inter-PDSN-handover, ungraceful A8 release, or rejecting a new session setup.

In a variant, the action can depend on the cause of actual or potential congestion or on assigned priority values or both.

Each of the above variants can be combined with one another.

According to certain embodiments, an apparatus can include receiving means for receiving an identification of an action to be taken with respect to at least one session and for receiving a notification of a cause for the action.

In a variant, the cause of the action can be an actual or potential network congestion.

In a variant, the actual or potential congestion can be a core network congestion.

In a variant, the apparatus can be a radio access network element.

In a variant, the radio access network element can be an access terminal

In a variant, the receiving can include receiving a message that includes a cause code.

In a variant, the message can be an A9-Release-A8-Complete message or an A9-Disconnect-A8 message or an A9-Update-A8 message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release, inter-PDSN-handover, ungraceful A8 release, or rejecting a new session setup.

In a variant, the action can depend on the cause of actual or potential congestion or on assigned priority values or both.

In a variant, the apparatus can further include statistics means for generating statistics based on the action, wherein the action is pegged to the cause in the statistics.

In a variant, the statistics can differentiate between core network reasons for decongestive actions and radio access network reasons for decongestive actions.

Each of the above variants can be combined with one another.

According to certain embodiments, an apparatus can include at least one processor and at least one memory comprising computer program code. The at least one memory and computer program code can be configured to, with the at least one processor, cause the apparatus at least to identify a cause of actual or potential congestion. The at least one memory and computer program code can also be configured to, with the at least one processor, cause the apparatus at least to notify a radio access network regarding the cause of actual or potential congestion.

In a variant, the apparatus can be a core network element.

In a variant, the actual or potential congestion can be a core network element congestion.

In a variant, the at least one memory and computer program code can be configured to, with the at least one processor, cause the apparatus at least to notify by sending a message comprising a cause code.

In a variant, the message can be an A11-Notify message or an A11-Registration reply message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the at least one memory and computer program code can be configured to, with the at least one processor, cause the apparatus at least to notify by notifying a packet control function located in the radio access network.

Each of the above variants can be combined with one another.

According to certain embodiments, an apparatus can include at least one processor and at least one memory comprising computer program code. The at least one memory and computer program code can be configured to, with the at least one processor, cause the apparatus at least to receive a notification of a cause of actual or potential congestion. The at least one memory and computer program code can also be configured to, with the at least one processor, cause the apparatus at least to take action with respect to at least one session based on the notification.

In a variant, the actual or potential congestion can be a core network congestion.

In a variant, the apparatus can be a first radio access network element.

In a variant, the first radio access network element can be a packet control function.

In a variant, the at least one memory and computer program code can be configured to, with the at least one processor, cause the apparatus at least to receive a first message comprising a cause code.

In a variant, the first message can be an A11-Notify message or an A11-Registration reply message.

In a variant, the at least one memory and computer program code can be configured to, with the at least one processor, cause the apparatus at least to transmit the cause code and the action to be taken in a second message to a second radio access network element.

In a variant, the second message can be an A9-Release-A8-Complete message or an A9-Disconnect-A8 message or an A9-Update-A8 message.

In a variant, the second radio access network element can be an access point.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release and inter-PDSN-handover and ungraceful A8 release and rejecting a new session setup.

In a variant, the action can depend on the cause of actual or potential congestion or on assigned priority values or both.

Each of the above variants can be combined with one another.

According to certain embodiments, an apparatus can include at least one processor and at least one memory comprising computer program code. The at least one memory and computer program code can be configured to, with the at least one processor, cause the apparatus at least to receive an identification of an action to be taken with respect to at least one session and a notification of a cause for the action.

In a variant, the cause of the action can be an actual or potential network congestion.

In a variant, the actual or potential congestion can be a core network congestion.

In a variant, the apparatus can be a radio access network element.

In a variant, the radio access network element can be an access terminal

In a variant, the at least one memory and computer program code can be configured to, with the at least one processor, cause the apparatus at least to receive a message comprising a cause code.

In a variant, the message can be an A9-Release-A8-Complete message or an A9-Disconnect-A8 message or an A9-Update-A8 message.

In a variant, the cause code can be generic to a plurality of network elements.

In a variant, the cause code can be specific to a particular network element or category of network elements.

In a variant, the cause code can be at least one of AAA congestion, HA congestion, PDSN congestion, or HSGW congestion.

In a variant, the action can be at least one of graceful A8 release, inter-PDSN-handover, ungraceful A8 release, or rejecting a new session setup.

In a variant, the action can depend on the cause of actual or potential congestion or on assigned priority values or both.

In a variant, the at least one memory and computer program code can be configured to, with the at least one processor, cause the apparatus at least to generate statistics based on the action, wherein the action is pegged to the cause in the statistics.

In a variant, the statistics can differentiate between core network reasons for decongestive actions and radio access network reasons for decongestive actions.

Each of the above variants can be combined with one another.

According to certain embodiments, a computer program product can include code for executing the method according to any of above described method embodiments in any of their variants.

In a variant, the computer program product can include a computer-readable medium bearing computer program code embodied therein for use with a computer.

According to certain embodiments, a non-transitory computer-readable medium can be encoded with instructions that, when executed in hardware, perform a process. The process can include the method of any of the above described method embodiments in any of their variants.

According to certain embodiments, a system can include a core network element comprising identifying means for identifying a cause of actual or potential congestion and notifying means for notifying a radio access network regarding the cause of actual or potential congestion. The system can also include a first access network element comprising receiving means for receiving the notification of the cause of actual or potential congestion and decongesting means for taking action with respect to at least one session based on the notification. The system can further include a second access network element comprising receiving means for receiving an identification of the action to be taken with respect to at least one session and for receiving a notification of a cause for the action.

BRIEF DESCRIPTION OF THE DRAWINGS:

For proper understanding of the invention, reference should be made to the accompanying drawings, wherein.

Figure 1:
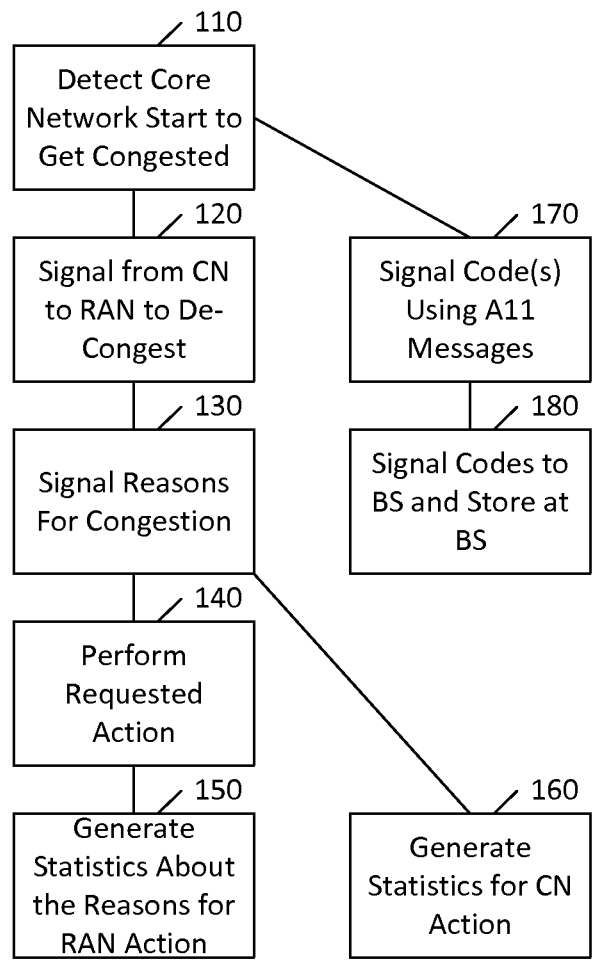
FIG. 1 illustrates a method according to certain embodiments.

DETAILED DESCRIPTION:

Certain embodiments may provide tracking of congestion relief support for calls that are blocked, released, and handed off due to congestion relief More particularly, certain embodiments may store network statistics, for example in code division multiple access (CDMA) networks, at a radio access network (RAN). Moreover, in certain embodiments these network statistics may be downloaded from the RAN. The core network may have no knowledge about session related statistics. As described above, conventionally session release/handover/blocking in the RAN would be associated with normal session release/handover/blocking in the RAN, masking problems in the core network a RAN operator may desire to be aware of Being aware of such problems may permit the RAN operator to take appropriate corrective actions and inform the core network operator.

Therefore certain embodiments may associate core network failure statistics with call setup failures. For example, new incoming sessions initiated by a user equipment (UE) may be deliberately blocked by the RAN in response to core network congestion notification, for example from third generation partnership project 2 (3GPP2) or long term evolution (LTE) networks. Certain embodiments may correctly associate session releases and handovers triggered by for example 3GPP2 or LTE core network congestion with the core network congestion troubles that caused the actions.

More specifically, certain embodiments provide methods and devices for transferring the cause for core network congestion, determine actions related to the cause and optionally accurately generating and pegging core network failure statistics for the performed action, like for example blocked calls, ungracefully dropped calls, gracefully released calls, and both graceful/ungracefully handed off calls. The congestion cause statistics may be stored in the RAN and later download by a RAN operator to identify potential problems in the core network before a network failure occurs.

Thus, certain embodiments provide a devices and methods for generating and conveying call failure statistics by a RAN when core network congestion, or the potential of core network congestion, is detected. The RAN may convey the reason for blocked, released, and handed off sessions and may correctly associate them with the problems in the core network that triggered these network actions.

In the following various network element names are used. PDSN/HSGW and AN-AAA network elements are meant to be located in the core network, while Packet Control Function (PCF), access node (AN) and access terminal (AT) are meant to be located in the radio access network. An access node (AN) located in the radio access network may be for example a base station (BS). An access terminal (AT) may be for example a mobile device (like for example a mobile phone, a personal digital assistant (PDA), a laptop, a tablet device, or other mobile computing device) which may be also referred to as mobile terminal (MT) or user equipment (UE). There is no requirement that the AT actually be mobile or even that it be capable of being mobile.

FIG. 1 illustrates a method according to certain embodiments. As shown in FIG. 1, the method may comprise, at 110, detecting that the core network (CN) starts to get congested. This may be a point at which congestion has begun or is anticipated to begin shortly. In other words, it may be actual or potential congestion that is detected. The method may also comprise, at 120, signaling from CN to RAN to take a decongestive action, such as signaling that certain calls are to be released/handed over and/or new calls are to be blocked by the RAN in order to reduce CN traffic.

The method may further comprise, at 130, signaling the reasons why certain calls shall be released/handover and/or new calls shall be blocked from CN to RAN. For example, the system may use A11 notify, A11 registration reply, A9 Disconnect=A8, A9 Release-A8-Complete, and/or A9-Update-A8 messages to signal the reason.

The method may additionally comprise, at 140, performing the requested action (release/block/hand over) in the RAN. The method may also comprise, at 150, generating statistics about the reason (different CN reasons & RAN reasons) why certain calls were released/blocked/handed over in the RAN.

The method may further comprise, at 160, the RAN generating core network statistics for blocked incoming call autonomously, based on the A11 notify. For sessions forced to release or handoff, at 170 the codes may be signaled in A11 notify and/or A11 registration reply messages. At 180, the release codes may then be signaled over A9 signaling from a packet control function (PCF) to an access network device, such as a base station (BS) for storage and retrieval there.

As described in U.S. Patent Application Ser. No. 61/565, 459 ("the '459 application"), filed Nov. 30, 2011, the entirety of which is hereby incorporated herein by reference, a graceful or ungraceful reduction in network traffic during periods of core network congestion may be accomplished by the PDSN/HSGW sending an A11 notification message to a wireless 3GPP2 radio access network (RAN). The message may trigger the RAN to suppress new session call setups, release an existing session, handoff existing sessions gracefully, or ungracefully release or handoff existing call sessions to an alternate PDSN or HSGW. These actions may impact some or all sessions associated with a PDSN or HSGW. Depending on the nature of the congestion occurring in the core network, a priority, subscription, or some other form of service level assigned to a call or subscriber may be used to determine which if not all new or existing sessions are impacted.

A method may be used to determine and assign a failure statistic to each session blocked, dropped, and handed off by a RAN due to core network congestion or potential core network congestion. To accomplish this, the RAN may reconfigure call failure statistics from normal release or handover, for example, to accurately determine the status of the core network via RAN statistics, so that appropriate measures may be taken by the operator to correct problems in the core network.

Some of these reasons for core network congestion may comprise HA congestion, PDSN congestion, HSGW congestion, and authentication, authorization, and accounting (AAA) congestion. For AAA congestion, it may be sufficient to limit or block all new call setups while existing calls continue. Other reasons for actual or potential core network congestion may be the CN congestion in which multiple entities are congested due to M2M communication.

In general, certain actions may occur as a result of and/or response to the actual or potential core network congestion. For example, new incoming session setup attempts may be blocked. Moreover, existing sessions may be forced to gracefully release. For example, MIP registration release procedures may occur between the PDSN/HWGW and RAN.

Additionally, existing packet sessions may be forced to ungracefully release. For example, a fast release with no MIP Registration Release procedures and no further A11 signaling may occur between the PDSN/HSGW and RAN. Alternatively, existing packet sessions may be forced to gracefully handoff to an uncongested PDSN/HSGW or existing packet session may be forced to ungracefully handoff with no MIP Registration Release procedures or further A11 signaling between the source PDSN/HSGW and RAN. Combinations of these alternatives are also possible.

The following embodiments may be used to generate appropriate congestion cause statistics so that a RAN operator may be alerted to potential problems and may be able to address them with congestion relief procedures before network failure occurs.

In a first embodiment, when congestion or potential congestion is detected in the core network the PDSN/HSWG may send an A11 notify message to the RAN containing a 'congestion cause' that may indicate what type of congestion is or may be occurring in the core network and the graceful indicator. A11 signaling may occur between the core network and the RAN, specifically, for example, between the PDSN/HSGW in the core network and the PCF in the RAN. For each session forced to gracefully release or handoff, the RAN may generate and peg a congestion cause statistic corresponding to the 'congestion cause' received in the A11 notification message and may store it for later download or retrieval by the RAN or network operator. The operator may then use these failure codes to identify and rectify problems in the core network.

In a second embodiment, when congestion or potential congestion is detected in the core network the PDSN/HSWG may send an A11 notification message to the RAN containing a 'congestion cause' that may indicate what type of congestion is or may be occurring in the core network and the ungraceful indicator. For each session ungracefully released or ungracefully handed off by the RAN due to core network congestion, the RAN may generate and peg the congestion cause statistic corresponding to the 'congestion cause' received in the A11 notification message and may store it for later download or retrieval by the RAN or network operator. The operator may then use these failure codes to identify and rectify problems in the core network.

In a third embodiment, when congestion or potential congestion is detected in the core network the PDSN/HSWG may send an A11 notification message to the RAN containing a 'congestion cause' that may indicate what type of congestion is or may be occurring in the core network and an indication to block all new sessions initiated by the UE. For each UE initiated session request blocked by the RAN due to the core network congestion, the RAN may generate and peg the congestion cause statistic corresponding to the 'congestion cause' received in the A11 notification message and may store it for later download or retrieval by the RAN or network operator. The operator may then use these failure codes to identify and rectify problems in the core network.

A fourth embodiment may be applicable to graceful session handoff and graceful releases. In this embodiment, after the PDSN/HSWG may have sent the A11 notification message comprising the new 'reason code' and the RAN may initiate MIP session release signaling with PDSN/HSGW, the PDSN/HSWG may respond with an A11 registration reply message containing the core network congestion reason code in addition to or instead of in the A11-Notify message. This embodiment may address a case where the PDSN may provide the core network congestion cause during MIP registration release, specifically in the A11 registration reply message.

In other words, the PDSN/HSGW may take the burden of generating the appropriate reason code for the session release in the A11 registration reply message, thereby relieving the RAN of the burden of supporting new signaling for conveying the congestion cause from the PCF to the BS.

Which sessions are to be released, blocked, or handed off may be determined by the priority of the user or sessions, and the priority specified in the A11 notify message. For example, if the priority of the device or session is lower than the priority indicated by the PDSN or HSGW, the congestion cause may be included in the A11 registration reply message. The RAN may peg the congestion cause statistic corresponding to the 'congestion cause code' received in the A11 registration reply message and may store it for later download or retrieval by the RAN or network operator. This may be done by the BS located in the RAN. The BS may receive the relayed congestion cause code for example from the PCF via A9 signaling. The operator may then use these failure codes to identify and rectify problems in the core network. Thus, pegging and storing statistics may occur in the BS within the RAN. Moreover, the congestion cause may be conveyed via A11 signaling, such as A11 notify, from the PDSN/HSGW to the PCF, then from the PCF to the BS via A9 signaling.

A fifth embodiment may facilitate PDSN/HSGW vendors who choose not to send a RAN action as specified in one embodiment of the '459 application, but only send the congestion reason code in the A11 notification message. In this embodiment, the PDSN/HSWG may only comprise 'Reason Code' in the A11 notify message and the RAN may autonomously determine which load shedding procedure to execute to reduce core network congestion based on the congestion reason code supplied in the A11 notification message and the priority.

The following actions may be performed by RAN based on a reason for the congestion. First, if the reason code indicates AAA congestion, the RAN may block new incoming session(s) based on the priority in the A11 notification message. Second, if the reason code indicates PDSN/HSGW congestion, the RAN may complete inter-PDSN handovers for sessions based on the priority included in the A11 notification message and/or may release or drop existing session(s). Third, if the reason code indicates HA congestion, the RAN may block new incoming calls and may drop existing calls based on the priority included in the message. If the core network indicates as Home Agent congestion, or signaling congestion, or just a general cause value indicating core network congestion, the RAN may perform all or some combination of available actions to reduce traffic in the core network including blocking new sessions, releasing existing sessions, or handing over existing sessions to new PDSN or HSGWs.

Figure 2:
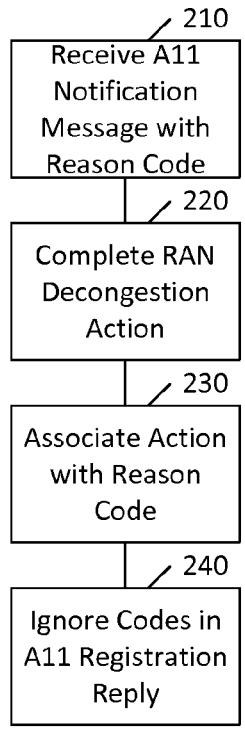
FIG. 2 illustrates another method according to certain embodiments.

FIG. 2 illustrates another method according to certain embodiments. The method of FIG. 2 may be a method for generating call failure statistics in a radio access network, for example a cdma2000 radio access network. The method may comprise, at 210, receiving by the radio access network an A11 notification message containing a reason code corresponding to a congestion event in the core network. The method may also comprise, at 220, completing in response to receiving the reason code at least one of the following actions: blocking at least one creation of a new packet data session initiated by a mobile device; releasing at least one of an existing packet data session and informing a core network entity (for example a PDSN or HSGW) associated with the packet data session; releasing at least one of an existing packet data session without informing a core network entity (for example a PDSN or HSGW) associated with the packet data session; completing an inter-core network entity handoff (for example an inter-PDSN handoff) for at least one existing packet data session, releasing the connection with a core network entity (for example a PDSN or HSGW) previously associated with the packet data session and informing the core network entity; or completing an inter core network entity handoff (for example an inter-PDSN handoff) for at least one existing packet data session, releasing the connection with a core network entity (for example a PDSN or HSGW) previously associated with the packet data session and not informing the core network entity. These actions may broadly be considered decongestion actions, and more particularly RAN decongestion actions.

The method may further comprise, at 230, associating the performed action with the reason code received in the A11-Notify message and, at 240, ignoring any codes received from the core network entity (for example PDSN or HSGW) in the A11 registration reply message as a result of performing the action triggered in response to the congestion notification (or the A11 notify message). More particularly, when an IP session is released, the A11 registration reply message may contain a code indicating successful release of the MIP session or, if an MIP error occurred, the reason for that error. However, in the case of graceful congestion release when A11 registration messages are exchanged, the system may not be able to rely on this code to generate a statistic indicating the reason that the session was released. Thus, instead a congestion cause value included in the A11 notify message can be associated with the reason for the session release. Moreover, a statistic can be generated in the access network based on the congestion cause value from the A11 notify message.

Figure 3:
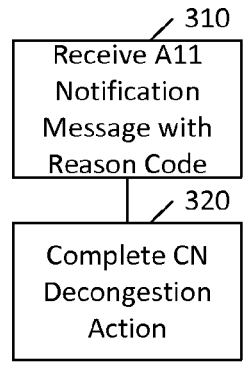
FIG. 3 illustrates a further method according to certain embodiments.

FIG. 3 illustrates a further method according to certain embodiments. The method of FIG. 3 may be a method for relieving core network congestion. The method may comprise, at 310, receiving by the radio access network an A11 notification message containing a reason code corresponding to some congestion event in the core network. The method may also comprise, at 320, in response to receiving the reason code performing one of the following actions: if the reason code signals congestion in the AAA, a creation of a packet data session initiated by a mobile device may be blocked, or if the reason code signals congestion in the HA, an existing packet data session may be released or handed off These actions may broadly be considered decongestion actions, and more particularly CN decongestion actions.

Figure 4:
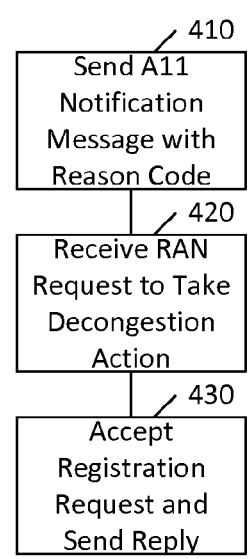
FIG. 4 illustrates an additional method according to certain embodiments.

FIG. 4 illustrates an additional method according to certain embodiments. The method of FIG. 4 may be a method for relieving congestion in a core network congestion. The method may comprise, at 410, sending by a core network entity (for example a PDSN/HSGW) a congestion indication, such as an A11 notify message to the RAN, the message may comprise a core network congestion failure code. The method may also comprise, at 420, receiving from the RAN in response to the notification a request to release or handoff at least one session due to the congestion. The method may further comprise, at 430, sending by the core network entity an A11 registration reply message containing the core network congestion reason code in the code field or normal vendor specific extension (NVSE) and accepting the A11 registration request message sent by the RAN.

Figure 5:
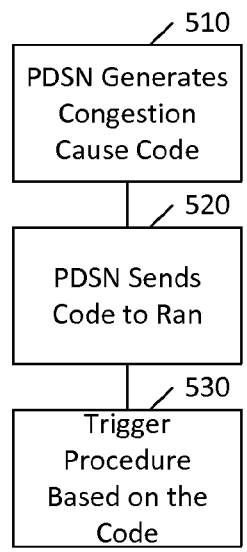
FIG. 5 illustrates another method according to certain embodiments.

FIG. 5 illustrates another method according to certain embodiments. As shown in FIG. 5, at 510 a core network entity (for example a PDSN) may generate a congestion cause code. Then, at 520, the core network entity may send this code to the RAN, which can, at 530, trigger a procedure based on the code, to reduce or relieve the congestion in the core network entity. This broadly can be any decongestive action, but may particularly be a RAN decongestive action.

Figure 6:
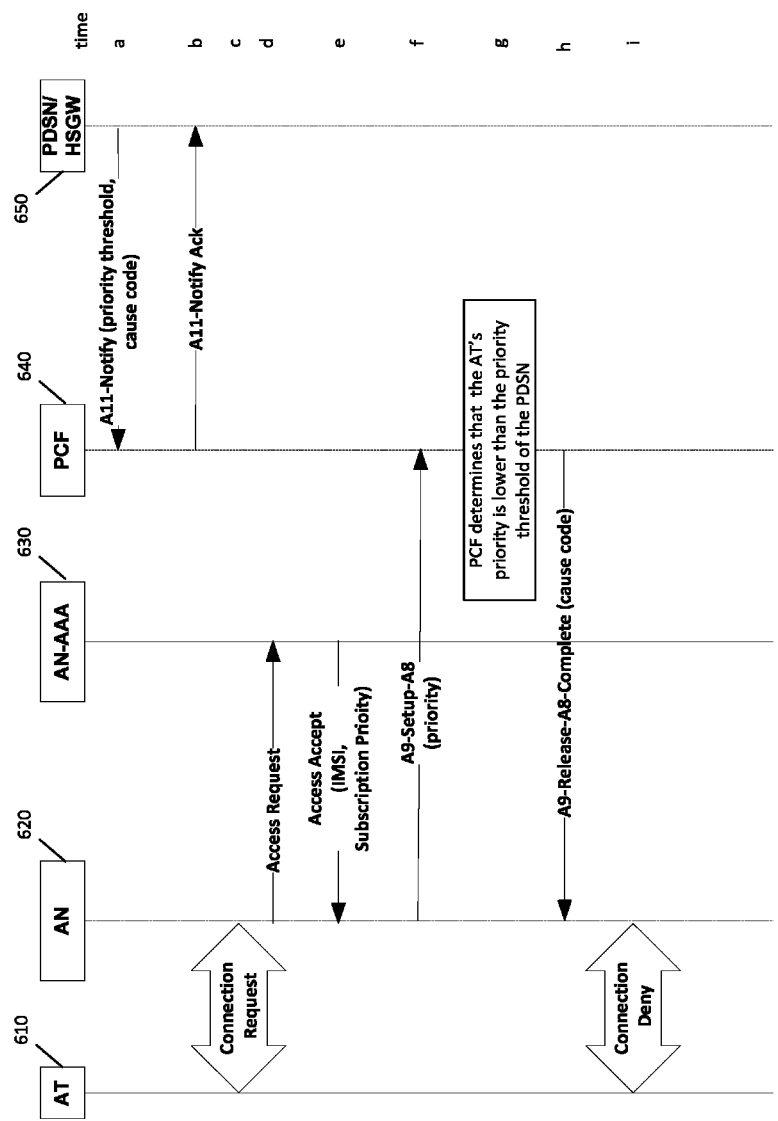
FIG. 6 illustrates a method according to certain embodiments, in which there is an access terminal (AT) request below PDSN priority threshold.

FIG. 6 illustrates a method according to certain embodiments, in which there is an access terminal (AT) request below PDSN priority threshold. The AT could be for example a mobile device (MD) or a mobile station (MS). As shown in FIG. 6, PDSN/HSGW 650 may initiate core network congestion relief by sending an A11 notify message containing a cause code indicating core network congestion in step a. The cause code may be generic (core network congestion) or specific to the entity experiencing congestion (AAA congestion, PDSN or HSGW congestion, HA congestion). The AT/device new session request may be denied because the subscription priority of the device is lower than the priority threshold indicated by the PDSN/HSGW 650 in the A11 notify message. The PCF 640 can include the cause code in the A9-Release-A8 complete message sent to the BS indicating core network congestion or the type of core network congestion as indicated in the A11 notify message sent by the PDSN/HSGW 650.

At step (a), the PDSN 650 may determine that it needs to set a new priority threshold with the PCF 640. The PDSN 650 may send an A11 notify message to the PCF 640 indicating core network congestion with the new priority threshold value. The A11 notify message may comprise a congestion cause code. The cause code may further indicate the type of core network congestion, for example AAA congestion, HA congestion, PDSN or HSGW congestion.

At step (b), the PCF 640 may recognize the A11 notify message and may store the new priority threshold for that PDSN 650. The PCF 640 may send an A11 notify Ack message to the PDSN 650.

At step (c), the AT may request a connection.

At step (d), the Access Network (AN) entity 620 (for example a base station) may send an access request message to the AN-AAA 630 on the A12 interface.

At step (e), the AN-AAA 630 may return an A12 access accept message that may comprise the true international mobile subscriber identity (IMSI) of the AT and the subscription priority.

At step (f), the AN 620 may send an A9-Setup-A8 message to the PCF 640 with the AT's priority.

At step (g), the PCF 640 may compare the priority received in the A9-Setup-A8 message to the priority threshold for the PDSN 650 and may determine that the request priority is lower than the priority threshold. The PCF 640 may also note that there are no other PDSNs that might service the AT.

At step (h), the PCF 640 may send an A9-Release-A8-complete message to the AN 620. The PCF 640 may comprise a cause code in the message indicating the reason the session is being denied is due to core network congestion. The cause code may further indicate the type of core network congestion, for example AAA congestion, HA congestion, PDSN or HSGW congestion. The AN 620 may link the cause value to the blocked session and/or pegs statistics associated with the cause code for later retrieval by the operator.

At step (i), the AN 620 may indicate that the connection is denied to the AT.

Figure 7:
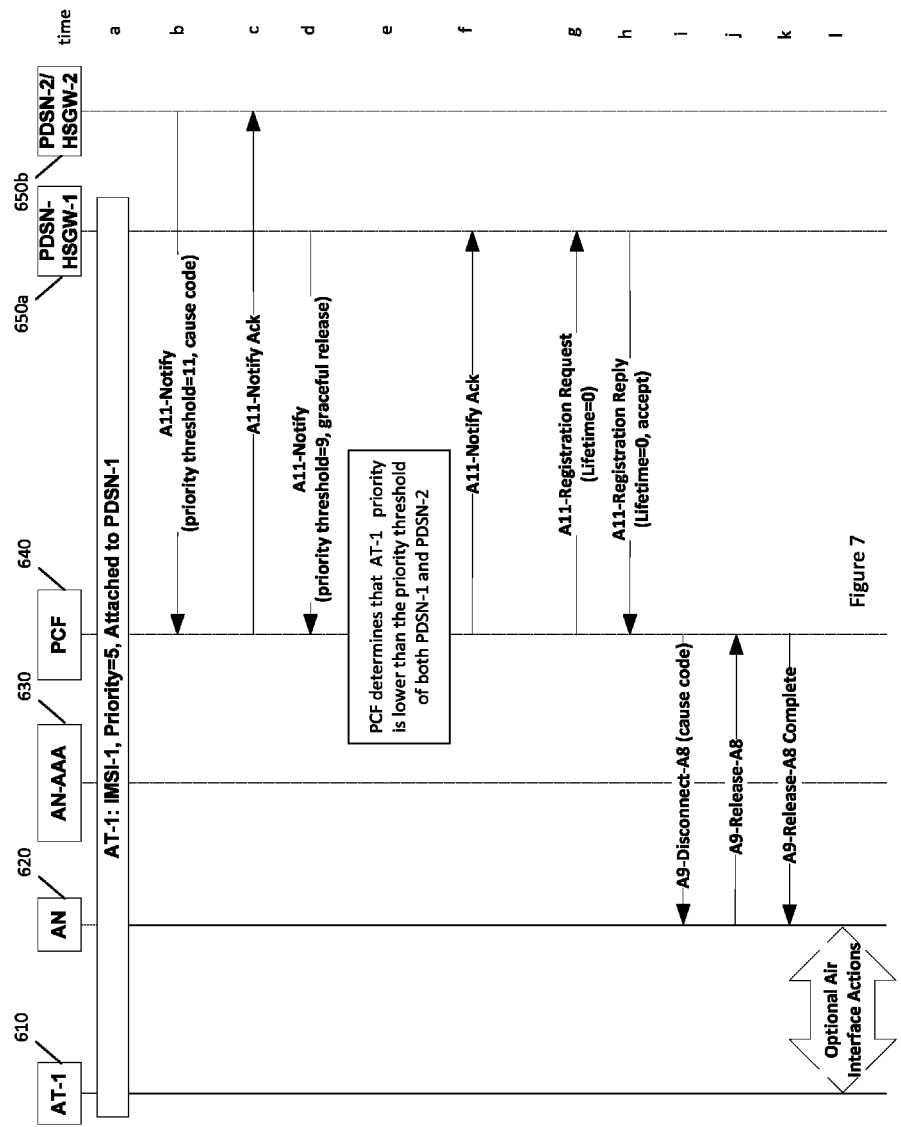
FIG. 7 illustrates a method according to certain embodiments, in which there is an existing session that is gracefully released.

FIG. 7 illustrates a method according to certain embodiments, in which there is an existing session that is gracefully released. In this embodiment the congestion relief may be initiated by PDSN-1 650*a* and PDSN-2 650*b*, and an existing AT session is gracefully released.

At step (a), the AT-1 610 may have an existing session with PDSN-1 650*a*. The highest priority service connection of AT-1 610 may be 5, and the PCF 640 may have used IMSI-1 to identify AT-1 610.

At step (b), the PDSN-2 650*b* can send an A11 notify message to the PCF 640 indicating core network congestion and to set its priority threshold to, for example, 11, since it has detected congestion. The A11 notify message may comprise a congestion cause code. The cause code may further indicate the type of core network congestion, for example AAA congestion, HA congestion, PDSN or HSGW congestion.

At step (c), the PCF 640 may acknowledge the priority threshold of PDSN-2 650*b* with an A11 notify Ack message.

At step (d), the PDSN-1 650*a* may send an A11 notify message to the PCF 640 indicating core network congestion and to set its priority threshold to 9, since it has detected congestion. The A11 notify message may comprise the congestion cause code. PDSN-2 650*a* may also indicate in this message that all existing sessions with a lower priority than the specified threshold are to be released gracefully, for example, using normal A11 signaling. The cause code may further indicate the type of core network congestion, for example AAA congestion, HA congestion, PDSN or HSGW congestion.

At step (e), the PCF 640 may determine that the priority of AT-1 610 is 5, which is lower than the PDSN-1 650*a* threshold. It may also note that the priority of AT-1 610 is lower than the PDSN-2 650*b* threshold, so AT-1 610 cannot be moved to PDSN-2 650*b*.

At step (f), the PCF 640 may acknowledge the priority threshold of PDSN-1 650*a* with an A11 notify Ack message.

At step (g), the PCF 640 may send an A11 registration request message for AT-1 610 to PDSN-1 650*a* indicating a lifetime of zero to terminate the A10 connections for AT-1 610.

At step (h), the PDSN-1 650*a* may reply with an A11 registration reply message indicating a lifetime of zero and acceptance of the A10 terminations.

At step (i), the PCF 640 may send an A9-Disconnect-A8 message to the AN 620 to initiate graceful A8 release. The PCF 640 may add a cause value in the message indicating the reason the session is being released is due to core network congestion. The cause code may further indicate the type of core network congestion, for example AAA congestion, HA congestion, PDSN or HSGW congestion. The AN 620 may link the cause value to the released session and/or may peg statistics associated with the cause code for later retrieval by the operator.

At step (j), the AN 620 may reply with an A9-Release-A8 message to the PCF 640.

At step (k), the PCF 640 may reply with an A9-Release-A8 complete message to the AN 620.

At step (l), the AN 620 may initiate air interface procedures with AT-1 610, e.g., radio session disconnect, redirection.

Figure 8:
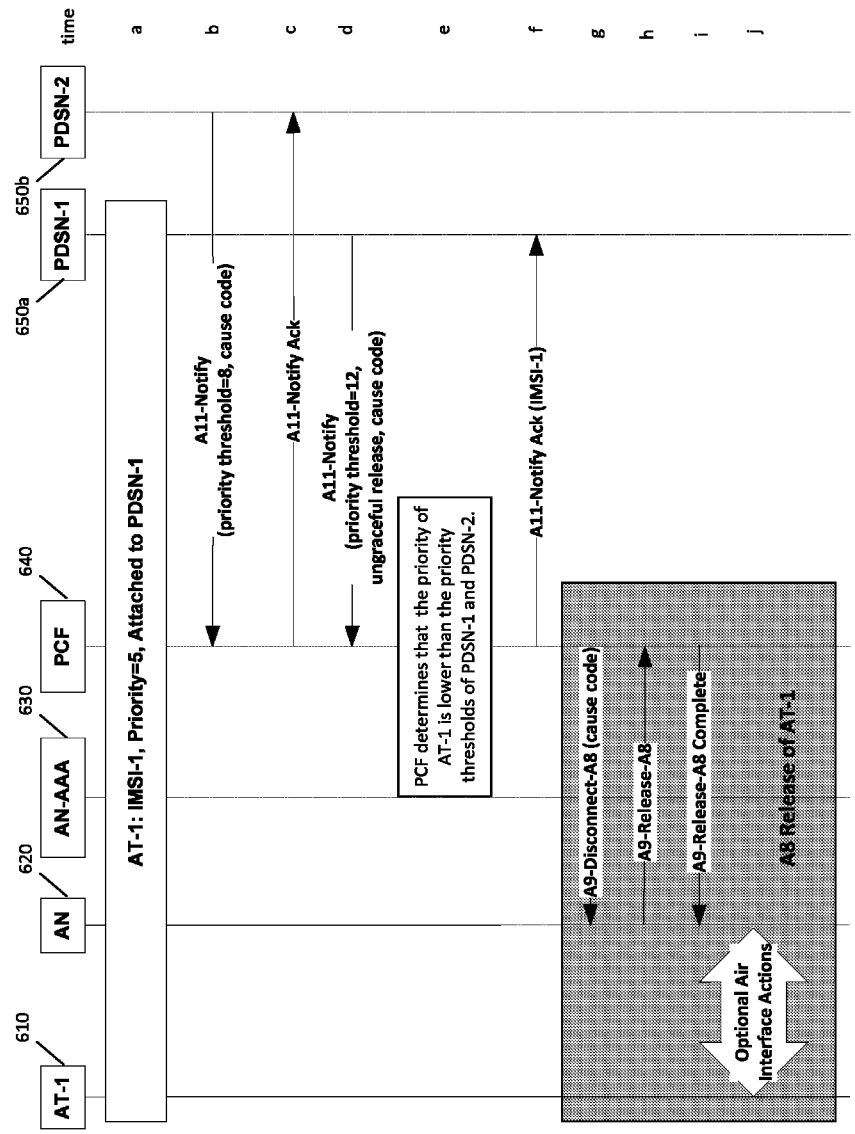
FIG. 8 illustrates a method according to certain embodiments, in which there is an ungraceful release of an existing session.

FIG. 8 illustrates a method according to certain embodiments, in which there is an ungraceful release of an existing session.

In this embodiment the congestion relief may be initiated by PDSN-1 650*a* and PDSN-2 650*b*. AT-1 610's priority may be lower than all accessible PDSNs. The PCF 640 may complete an ungraceful session release of AT-1 610's packet data session.

At step (a), the AT-1 610 may have an existing session with PDSN-1 650*a*. The highest priority service connection of AT-1 610 is 5, and the PCF 640 may have used IMSI-1 to identify AT-1 610.

At step (b), the PDSN-2 650*b* may send an A11 notify message to the PCF 640 indicating core network congestion to set its priority threshold to 8, since it has detected congestion. The A11 notify message may comprise a congestion cause code. The cause code may further indicate the type of core network congestion, for example AAA congestion, HA congestion, PDSN or HSGW congestion.

At step (c), the PCF 640 may acknowledge the priority threshold of PDSN-2 650*b* with an A11 notify Ack message.

At step (d), the PDSN-1 650*a* may send an A11 notify message to the PCF 640 indicating core network congestion to set its priority threshold to 12, since it has detected congestion. The A11 notify message may comprise a congestion cause code. PDSN-2 650*b* may also indicate in this message that all existing sessions with a lower priority than the specified threshold are to be released ungracefully, for example, without using normal A11 signaling. The cause code may further indicate the type of core network congestion, for example AAA congestion, HA congestion, PDSN or HSGW congestion.

At step (e), the PCF 640 may determine that the priority of AT-1 610 is 5, which is lower than the PDSN-1 650*a* threshold. It may also note that the priority of AT-1 610 is lower than the PDSN-2 650*b* threshold, so AT-1 610 cannot be moved to PDSN-2 650*b*.

At step (f), the PCF 640 may acknowledge the priority threshold of PDSN-1 650*a* with an A11 notify Ack message. This message may indicate one AT identity, IMSI-1, that will be disconnected from PDSN-1 650*a* ungracefully. PDSN-1 650*a* may internally release resources allocated to AT-1 610.

At step (g), the PCF 640 may send an A9-Disconnect-A8 message for AT-1 610 to the AN 620 to initiate graceful A8 release. The PCF 640 can add a cause value in the message indicating the reason the session is being released is due to core network congestion. The cause code may further indicate the type of core network congestion, for example AAA congestion, HA congestion, PDSN or HSGW congestion. The AN 620 may link the cause value to the released session and/or may peg statistics associated with the cause code for later retrieval by the operator.

At step (h), the AN 620 may reply with an A9-Release-A8 message to the PCF 640.

At step (i), the PCF 640 may reply with an A9-Release-A8 complete message to the AN 620.

At step (j), the AN 620 may initiate air interface procedures with AT-1 610, for example, radio session disconnect, redirection.

Figure 9:
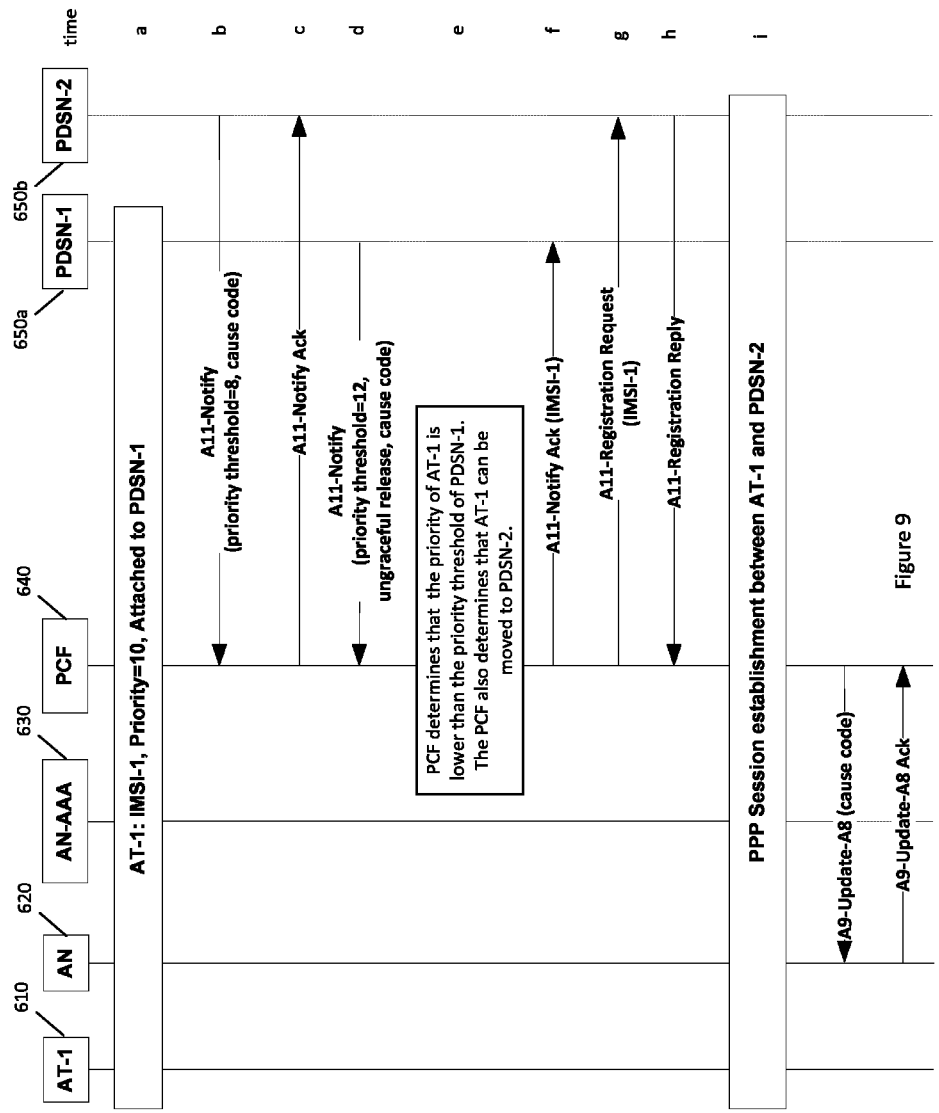
FIG. 9 illustrates a method according to certain embodiments, in which there is transfer of an existing session to another PDSN.

FIG. 9 illustrates a method according to certain embodiments, in which there is handover of an existing session to another PDSN.

In this embodiment the congestion relief may be initiated by PDSN-1 650*a* and PDSN-2 650*b*. AT-1 610's priority may be lower than PDSN-1 650*a*'s threshold, but higher than PDSN-2 650*b*'s threshold. The PCF 640 may connect AT-1 610 to PDSN-2 650*b* and a new point-to-point protocol (PPP) session is setup for AT-1 610.

At step (a), the AT-1 610 may have an existing session with PDSN-1 650*a*. The highest priority service connection of AT-1 610 is 10, and the PCF 640 may have used IMSI-1 to identify AT-1 610.

At step (b), the PDSN-2 650*b* may send an A11 notify message to the PCF 640 indicating core network congestion to set its priority threshold to 8, since it has detected congestion. The A11 notify message may comprise a congestion cause code. The cause code may further indicate the type of core network congestion, for example AAA congestion, HA congestion, PDSN or HSGW congestion.

At step (c), the PCF 640 may acknowledge the priority threshold of PDSN-2 650*b* with an A11 notify Ack message.

At step (d), the PDSN-1 650*a* may send an A11 notify message to the PCF 640 indicating core network congestion to set its priority threshold to 12, since it has detected or potential congestion. The A11 notify message may comprise a congestion cause code. PDSN-1 650*a* may also indicate in this message that all existing sessions with a lower priority than the specified threshold are to be released ungracefully, for example, without using normal A11 signaling. The cause code may further indicate the type of core network congestion, for example AAA congestion, HA congestion, PDSN or HSGW congestion.

At step (e), the PCF 640 may determine that the priority of AT-1 610 is 10, which is lower than the PDSN-1 650*a* threshold. It may also note that the priority of AT-1 610 is above the threshold of PDSN-2 650*b*.

At step (f), the PCF 640 may acknowledge the priority threshold of PDSN-1 650*a* with an A11 notify Ack message. This message may indicate one AT identity, IMSI-1, that will be disconnected from PDSN-1 650*a* ungracefully. PDSN-1 650*a* may internally release resources allocated to AT-1 610.

At step (g), the PCF 640 may send an A11 registration request message for AT-1 610 to PDSN-2 650*b* to initiate a new A10 connection for AT-1 610.

At step (h), the PDSN-2 650*b* may reply with an A11 registration reply message.

At step (i), the AT-1 610 and PDSN-2 650*b* may setup a PPP session using normal signaling.

At step (j), the PCF 640 may send an A9-Update-A8 message to the AN 620 to indicate that the reason for the inter-PDSN-handover was core network congestion. The A9-Update-A8 message may comprise a congestion cause code. The cause code may be set to indicate core network congestion. This message may be sent prior to step (i), for example before the inter-PDSN handover occurs. Alternatively it may be sent after the inter-PDSN handover occurs. The AN 620 may link the cause value to the handed off session and/or may peg statistics associated with the cause code for later retrieval by the operator.

At step (k), the AN 620 may acknowledge the A9-Update-A8 message from the PCF 640.

In certain embodiments, an A9 interface message, for example A9-Release-A8, is sent from the PCF to the AN to acknowledge completion of the request to release the A8 connection or to indicate to the BS that an A8 connection has not been established due to either PCF (or PDSN) resources being unavailable, core network congestion, during dormant handoffs if the PDSN has no data to send, during a CCPD Mode call setup or as a requirement of terminal authentication in HRPD systems.

Likewise, in certain embodiments, an A9-Update-A8 message is sent from the PCF to the BS to update the BS with new or updated parameters for a packet data service instance (PDSI) or packet data session. The packet data session shall be active when this message is sent to the BS.

The A9-Update-A8 message is sent from the BS to the PCF to convey accounting information to the PCF if the A8 connection is established before traffic channel establishment (in which case the PCF resumes data transmission on the A8 connection only after it receives the A9-Update-A8 message) or while a PDSI is active following accounting parameter changes which need to be conveyed to the PDSN indirectly via the PCF.

The base station (BS) may send an A9-Update-A8 message to the PCF to indicate if short data bursts may be sent to the AT (for example a mobile station (MS)). The PCF may send an A9-Update-A8 message to the BS if the MS's short data burst (SDB) capability is cached at the PCF so the BS does not need to query the MS for its SDB capability. The BS may also send the A9-Update-A8 Ack message to the PCF to indicate a successful Short Data Burst delivery to the MS if the PCF was not informed previously that the SDB was delivered successfully to the MS.

The A9-Update-A8 Ack message may also be used to inform the PCF of an authentication failure at the mobile switching center (MSC) following an access attempt by an MS undergoing dormant handoff The BS may also use this message to inform the PCF that a dormant MS has powered down. In these two cases, the PCF may initiate the release of all A10 connections associated with the MS.

Figure 10:
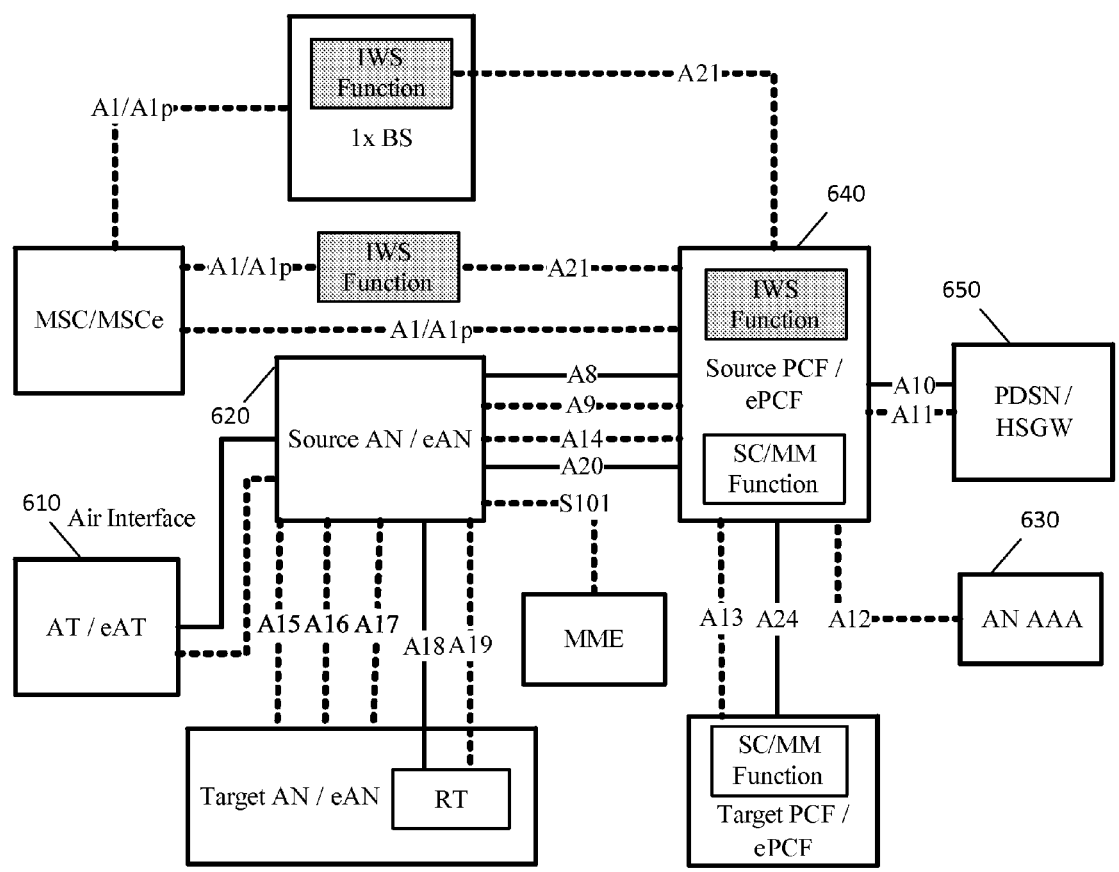
FIG. 10 illustrates an architecture in which section control and mobility management (SC/MM) is in an enhanced packet control function (ePCF), according to certain embodiments.
Figure 11:
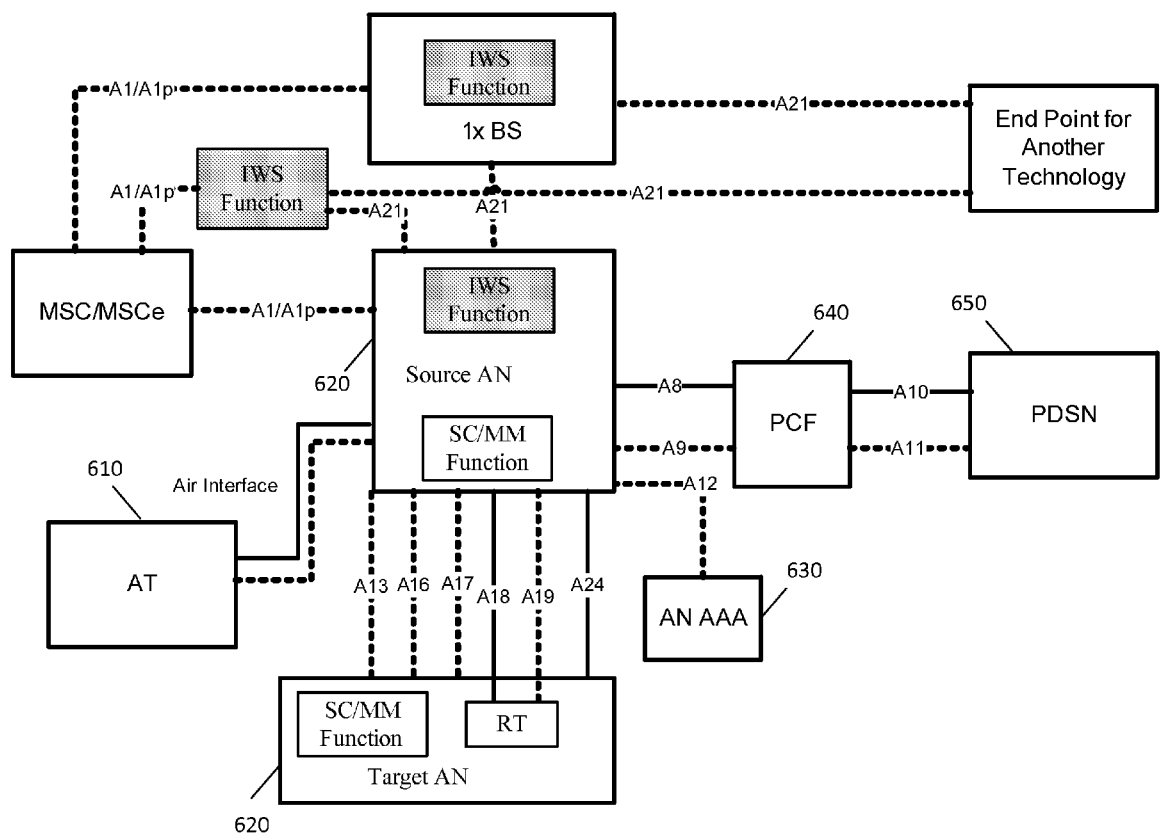
FIG. 11 illustrates an architecture in which SC/MM is in the access network, according to certain embodiments.
Figure 12:
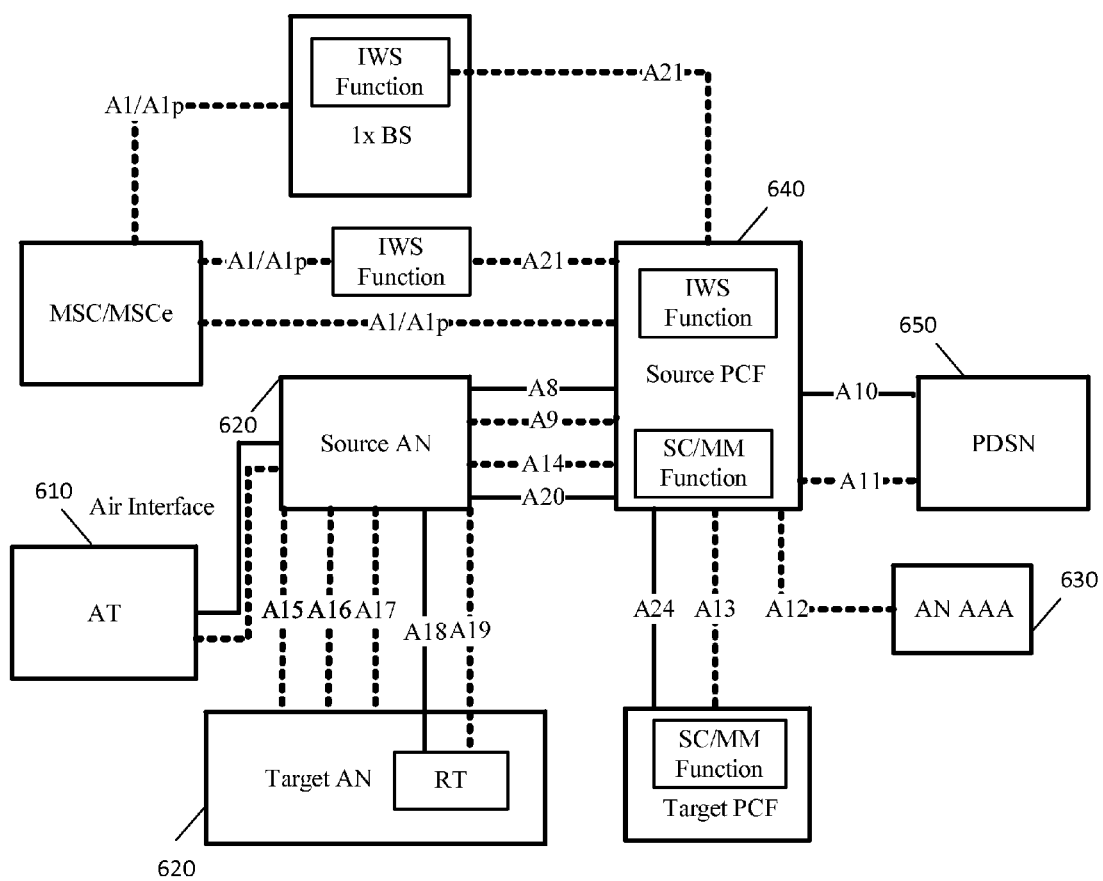
FIG. 12 illustrates an architecture in which SC/MM in the packet control function, according to certain embodiments.

The PCF may send an A9-Update-A8 message to the AN if an inter-PDSN session handoff was completed due to congestion relief FIG. 10 illustrates a system architecture in which SC/MM is in the PCF/ePCF 640. As shown in FIG. 10, the A11 interface may carry signaling information between the PCF/ePCF 640 and the PDSN/HSGW 650. The A9 interface may carry signaling information between the AN/eAN 620 and the CF/ePCF 640. FIG. 11 illustrates an architecture in which SC/MM is in the Source AN 620. FIG. 12 illustrates an architecture in which SC/MM is in the Source PCF 640.

Figure 13:
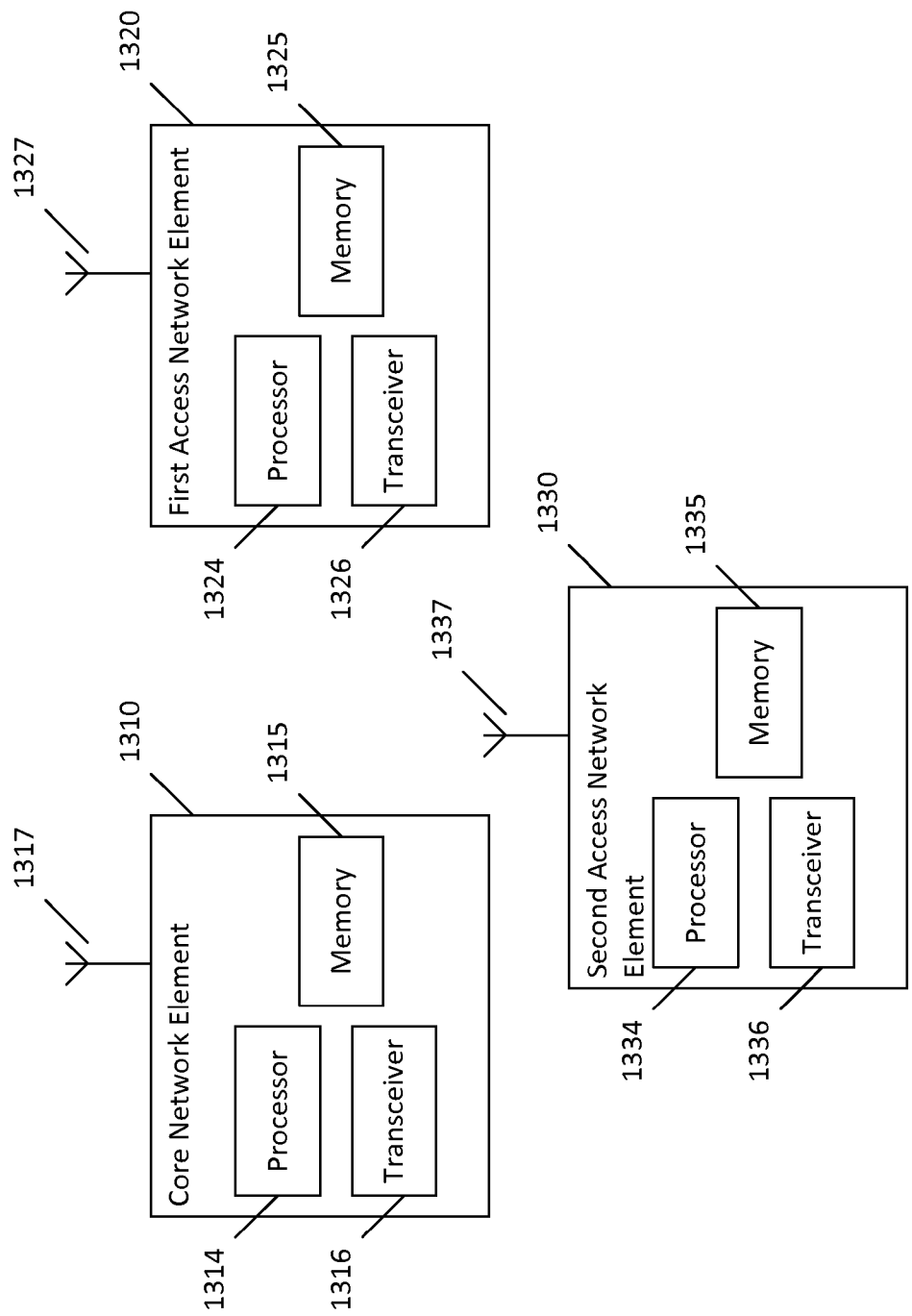
FIG. 13 illustrates a system according to certain embodiments of the invention.

FIG. 13 illustrates a system according to certain embodiments of the invention. In one embodiment, a system may comprise several devices, such as, for example, core network element 1310, first access network element 1320, and second access network element 1330. The system may comprise more than two first access network elements and more than one core network element, although only one core network element and two access network elements are shown for the purposes of illustration. See FIGS. 10-12 for some examples of illustrative architectures.

Each of the devices in the system may comprise at least one processor, respectively indicated as 1314, 1324, and 1334. At least one memory may be provided in each device, and indicated as 1315, 1325, and 1335, respectively. The memory may comprise computer program instructions or computer code contained therein. One or more transceiver 1316, 1326, and 1336 may be provided, and each device may also comprise an antenna, respectively illustrated as 1317, 1327, and 1337. Although only one antenna each is shown, many antennas and multiple antenna elements may be provided to each of the devices. Other configurations of these devices, for example, may be provided. For example, core network element 1310 and first access network element 1320 may be additionally or solely configured for wired communication, and in such a case antennas 1317, 1327, and 1337 may illustrate any form of communication hardware, without being limited to merely an antenna.

Transceivers 1316, 1326, and 1336 may each, independently, be a transmitter, a receiver, or both a transmitter and a receiver, or a unit or device that may be configured both for transmission and reception.

Processors 1314, 1324, and 1334 may be embodied by any computational or data processing device, such as a central processing unit (CPU), application specific integrated circuit (ASIC), or comparable device. The processors may be implemented as a single controller, or a plurality of controllers or processors.

Memories 1315, 1325, and 1335 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as core network element 1310, first access network element 1320, and second access network element 1330, to perform any of the processes described above (see, for example, FIGS. 1-9). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Figure 14:
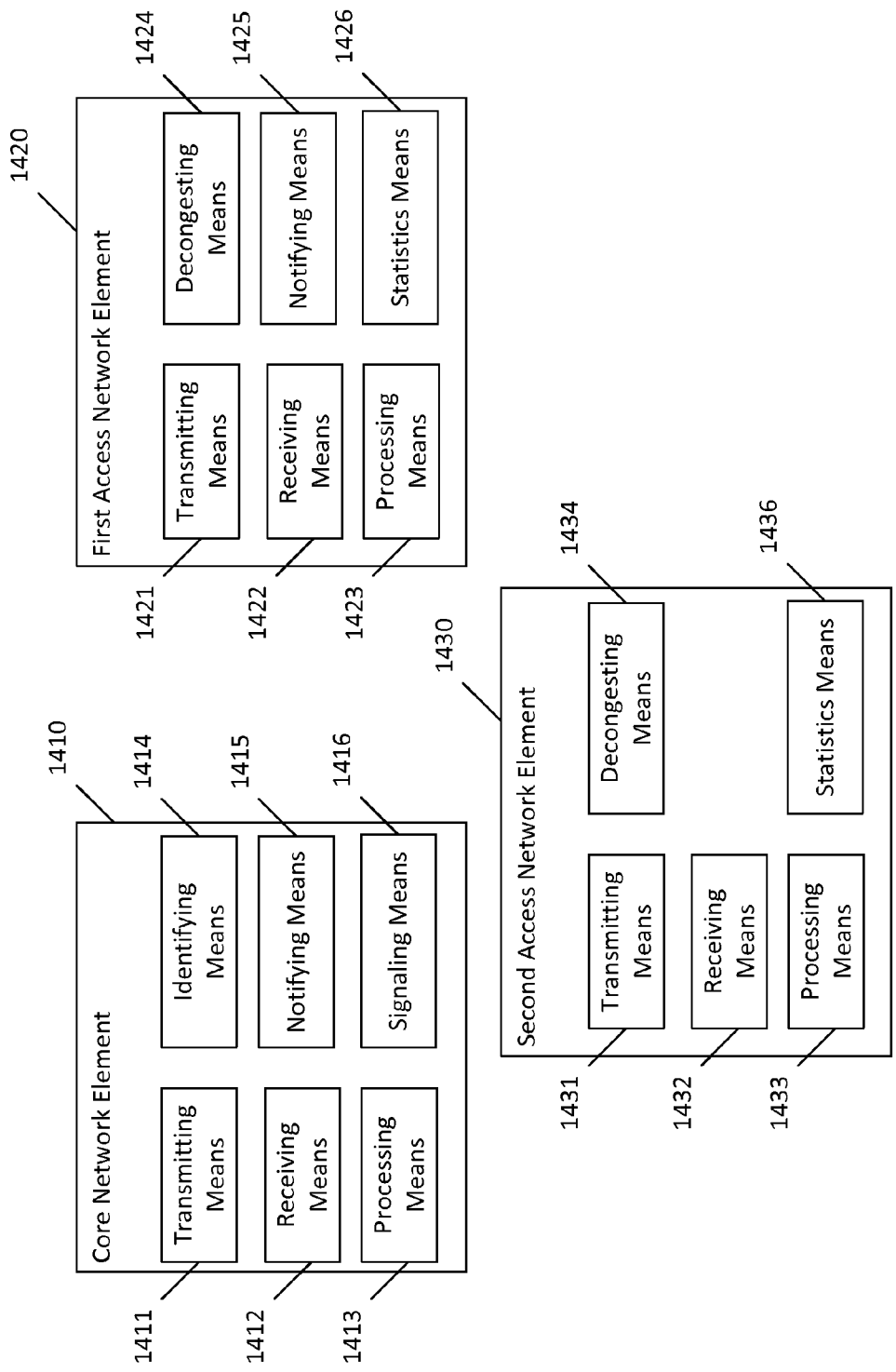
FIG. 14 illustrates another system according to certain embodiments.

FIG. 14 illustrates a system according to certain embodiments. The system of FIG. 14 may be similar to the system of FIG. 13, in that it may comprise at least one core network element 1410 and at least two access network elements: a first access network element 1420 and a second access network element 1430.

The core network element 1410 may comprise transmitting means 1411, receiving means 1412, and processing means 1413, for carrying out any of the above-described methods.

The core network element 1410 may also comprise identifying means 1414 for identifying a cause of actual or potential congestion. The core network element 1410 may also comprise notifying means 1415 for notifying a radio access network regarding the cause of actual or potential congestion.

The notifying means 1415 may further be for notifying the radio access network regarding the actual or potential congestion. Moreover, the notifying means 1415 may further be for sending a message comprising a cause code. The cause code may be generic to a plurality of network elements or may be specific to a particular network element or category of network elements.

The notifying may comprise notifying a packet control function. The notifying may also or alternatively comprise notifying the radio access network using a packet control function.

The notifying may comprise notifying regarding a priority level. Moreover, the notifying may comprise using A11 notify, A11 registration reply, A9 disconnect, A9 release, and/or A8 Ack messages to signal the cause.

The core network element 1410 may further comprise signaling means 1416 for signaling at least one release code corresponding to the cause from a packet control function to a base station for storage.

The first access network element 1420 may be a radio access network element, such as a packet control function. The first access network element 1420 may, like the core network element 1410, comprise transmitting means 1421, receiving means 1422, and processing means 1423, for carrying out any of the above-described methods. The first access network element 1420 may be a packet control function.

More specifically, the receiving means 1422 may be for receiving a notification of a cause of actual or potential congestion. Moreover, the first access network element 1420 may comprise decongesting means 1424 for taking action with respect to at least one session based on the notification.

The receiving means 1422 may further be for receiving a further notification of the actual or potential congestion, wherein the taking action is based on the further notification.

The first access network element 1420 may further comprise statistics means 1426 for generating statistics based on the action, wherein the action is pegged to the cause in the statistics. The statistics may differentiate between core network reasons for decongestive actions and radio access network reasons for decongestive actions.

The second access network element 1430 may be a radio access network element. The first access network element 1430 may, like the core network element 1410, comprise transmitting means 1431, receiving means 1432, and processing means 1433, for carrying out any of the above-described methods.

More specifically, the receiving means 1432 may be for receiving an identification of an action to be taken with respect to at least one session and for receiving a notification of a cause for the action. The second access network element 1430 may be, for example, an access network or base station.

The second access network element 1430 may also include decongesting means 1434 for taking the action identified. Moreover, the second access network element 1430 may include statistics means 1436 for statistics means for generating statistics based on the action, wherein the action is pegged to the cause in the statistics.

The A11-Notify message can be variously embodied. The following table shows a bitmap layout for an A11-Notify message.

TABLE 3.9

| | | | All-Notify | | | | | |
|---|---|---|---|---|---|---|---|---|
| 0 | 1 | 2 | 3 | 4 | 5 | 6 | 7 | Octet |
| | | ⇒ Message Type = [1AH] | | | | | | 1 |
| (MSB) | | ⇒ Identification = <any value> | | | | | | 1 |
| | | | | | | | | 2 |
| | | | | | | | | 3 |
| | | | | | | | | 4 |
| | | | | | | | | 5 |
| | | | | | | | | 6 |
| | | | | | | | | 7 |
| | | | | | | | (LSB) | 8 |
| | | ⇒ Cause = [xxH] | | | | | | 1 |
| | | Length = 01H | | | | | | 2 |
| | | | ⇒ Cause = [ [00H (Core network Congestion) 01H (Core network (AAA) Congestion) 02H (Core network (HA) Congestion) 03H (Core network (PDSN) Congestion) 04H (Core network (HSGW) Congestion)]] | | | | | | 1 |
| | | | ⇒ Priority Threshold = [21H] | | | | | 1 |
| | | | Length = 01H | | | | | 2 |
| Reserved = [0] | Ungraceful Termination = [0, 1] | Apply to Existing Connections = [0, 1] | Apply to New Connections = [0, 1] | Priority = <any value> | | | | 3 |

Likewise, the A9-Release-A8 Complete can be variously embodied. The following table shows a bitmap layout for an A9-Release-A8 Complete message.

| | | | 3.2.2 A9-Release-A8 Complete | | | | | |
|---|---|---|---|---|---|---|---|---|
| 7 | 6 | 5 | 4 | 3 | 2 | 1 | 0 | Octet |
| | | ⇒ A9 Message Type = [05H] | | | | | | 1 |
| | | ⇒ Call Connection Reference: A9 Element Identifier = [3FH] | | | | | | 1 |
| | | Length = [08H] | | | | | | 2 |
| (MSB) | | Market ID = <any value> | | | | | | 3 |
| | | | | | | | (LSB) | 4 |
| (MSB) | | Generating Entity ID = <any value> | | | | | | 5 |
| | | | | | | | (LSB) | 6 |
| (MSB) | | Call Connection Reference = <any value> | | | | | | 7 |
| | | | | | | | | 8 |
| | | | | | | | | 9 |
| | | | | | | | (LSB) | 10 |
| | | ⇒ Correlation ID: A9 Element Identifier = [13H] | | | | | | 1 |
| | | Length = [04H] | | | | | | 2 |
| (MSB) | | Correlation Value = <any value> | | | | | | 3 |
| | | | | | | | | 4 |
| | | | | | | | | 5 |
| | | | | | | | (LSB) | 6 |
| | | ⇒ Cause: A9 Element Identifier = [04H] | | | | | | 1 |
| | | Length = [01H] | | | | | | 2 |
| ext = [0] | | Cause Value = [79H (PDSN resources are not available), 32H (PCF resources are not available), 20H (Equipment failure), 10H (Packet call going dormant), 07H (OAM&P intervention) 21H (Core network Congestion) 22H (Core network (AAA) Congestion) 23H (Core network (HA) Congestion) 24H (Core network (PDSN) Congestion) \25H (Core network (HSGW) Congestion)]] | | | | | | 3 |
| | | ⇒ A9 PDSN Code: A9 Element Identifier = [0CH] | | | | | | 1 |
| | | Length = [01H] | | | | | | 2 |

-continued

| 3.2.2 A9-Release-A8 Complete |||||||||  |
|---|---|---|---|---|---|---|---|---|
| 7 | 6 | 5 | 4 | 3 | 2 | 1 | 0 | Octet |
| colspan 8: PDSN Code = [00H (Registration Accepted), 80H (Registration Denied - reason unspecified) 81H (Registration Denied - administratively prohibited) 82H (Registration Denied - insufficient resources) 83H (Registration Denied - mobile node failed authentication) 85H (Registration Denied - identification mismatch) 86H (Registration Denied - poorly formed request) 88H (Registration Denied - unknown PDSN address) 89H (Registration Denied - requested reverse tunnel unavailable) 8AH (Registration Denied - reverse tunnel is mandatory and 'T' bit not set) 8DH (Registration Denied - unsupported vendor ID or unable to interpret data in the CVSE)] |||||||| 3 |
| colspan 8: ⇒ SR_ID: A9 Element Identifier = [0BH] |||||||| 1 |
| colspan 8: Length = [01H] |||||||| 2 |
| colspan 8: Reserved = [0000 0]    IS-2000 SR_ID = [001-011] |||||||| 3 |

Likewise, the A9-Disconnect-A8 can be variously embodied. The following table shows a bitmap layout for an A9-Disconnect-A8 message.

| 3.2.3 A9-Disconnect-A8 |||||||||  |
|---|---|---|---|---|---|---|---|---|
| 7 | 6 | 5 | 4 | 3 | 2 | 1 | 0 | Octet |
| colspan 8: ⇒ A9 Message Type = [03H] |||||||| 1 |
| colspan 8: ⇒ Call Connection Reference: A9 Element Identifier = [3FH] |||||||| 1 |
| colspan 8: Length = [08H] |||||||| 2 |
| colspan 8: (MSB)     Market ID = <any value> |||||||| 3 |
| colspan 8: (LSB) |||||||| 4 |
| colspan 8: (MSB)     Generating Entity ID = <any value> |||||||| 5 |
| colspan 8: (LSB) |||||||| 6 |
| colspan 8: (MSB)     Call Connection Reference = <any value> |||||||| 7 |
| colspan 8: |||||||| 8 |
| colspan 8: |||||||| 9 |
| colspan 8: (LSB) |||||||| 10 |
| colspan 8: ⇒ Correlation ID: A9 Element Identifier = [13H] |||||||| 1 |
| colspan 8: Length = [04H] |||||||| 2 |
| colspan 8: (MSB)    Correlation Value = <any value> |||||||| 3 |
| colspan 8: |||||||| 4 |
| colspan 8: |||||||| 5 |
| colspan 8: (LSB) |||||||| 6 |
| colspan 8: ⇒ Mobile Identity (IMSI): A9 Element Identifier = [0DH] |||||||| 1 |
| colspan 8: Length = [06H-08H] (10-15 digits) |||||||| 2 |
| Identity Digit 1 = [0H-9H] (BCD) |||| Odd/even Indicator = [1, 0] || Type of Identity = [110] (IMSI) ||| 3 |
| Identity Digit 3 = [0H-9H] (BCD) |||| Identity Digit 2 = [0H-9H] (BCD) |||| 4 |
| colspan 8: . . . |||||||| . . . |
| Identity Digit N + 1 = [0H-9H] (BCD) |||| Identity Digit N = [0H-9H] (BCD) |||| n |
| Identity Digit N + 3 = [0H-9H] (BCD) (if odd number of digits) = [1111] (if even number of digits) |||| Identity Digit N + 2 = [0H-9H] (BCD) |||| n + 1 |
| colspan 8: ⇒ Mobile Identity (ESN): A9 Element Identifier = [0DH] |||||||| 1 |
| colspan 8: Length = [05H] |||||||| 2 |
| Identity Digit 1 = [0000] |||| Odd/even Indicator = [0] || Type of Identity = [101] (ESN) ||| 3 |
| colspan 8: (MSB)    ESN = <any value> |||||||| 4 |
| colspan 8: |||||||| 5 |
| colspan 8: |||||||| 6 |
| colspan 8: (LSB) |||||||| 7 |

-continued

| 3.2.3 A9-Disconnect-A8 | | | | | | | | |
|---|---|---|---|---|---|---|---|---|
| 7 | 6 | 5 | 4 | 3 | 2 | 1 | 0 | Octet |
| | ⇒ | CON_REF: A9 Element Identifier = [01H] | | | | | | 1 |
| | | Length = [01H] | | | | | | 2 |
| | | IS-2000 CON_REF = [00H-FF] | | | | | | 3 |
| | ⇒ | A8 Traffic ID: A9 Element Identifier = [08H] | | | | | | 1 |
| | | Length = [0CH] | | | | | | 2 |
| | | A8 transport protocol stack = [01H] (GRE/IP) | | | | | | 3 |
| (MSB) | | Protocol Type = [88 81H] (Unstructured byte stream) | | | | | | 4 |
| | | | | | | | (LSB) | 5 |
| (MSB) | | Key = <any value> | | | | | | 6 |
| | | | | | | | | 7 |
| | | | | | | | | 8 |
| | | | | | | | (LSB) | 9 |
| | | Address Type = [01H] (IPv4) | | | | | | 10 |
| (MSB) | | IP Address = <any value> | | | | | | 11 |
| | | | | | | | | 12 |
| | | | | | | | | 13 |
| | | | | | | | (LSB) | 14 |
| | ⇒ | Cause: A9 Element Identifier = [04H] | | | | | | 1 |
| | | Length = [01H] | | | | | | 2 |
| ext = [0] | | Cause Value = | | | | | | 3 |
| | | [14H (Normal call release), | | | | | | |
| | | 20H (Equipment failure), | | | | | | |
| | | 07H (OAM&P intervention), | | | | | | |
| | | 32H (PCF resources are not available), | | | | | | |
| | | 79H (PDSN resources are not available) | | | | | | |
| | | 21H (Core network Congestion) | | | | | | |
| | | 22H (Core network (AAA) Congestion) | | | | | | |
| | | 23H (Core network (HA) Congestion) | | | | | | |
| | | 24H (Core network (PDSN) Congestion) | | | | | | |
| | | 25H (Core network (HSGW) Congestion)] | | | | | | |
| | ⇒ | A9 PDSN Code: A9 Element Identifier = [0CH] | | | | | | 1 |
| | | Length = [01H] | | | | | | 2 |
| | | PDSN Code = | | | | | | 3 |
| | | [C1H (Connection Release - reason unspecified), | | | | | | |
| | | C2H (Connection Release - PPP time-out ), | | | | | | |
| | | C3H (Connection Release - registration time-out), | | | | | | |
| | | C4H (Connection Release - PDSN error), | | | | | | |
| | | C5H (Connection Release - inter-PCF handoff), | | | | | | |
| | | C6H (Connection Release - inter-PDSN handoff), | | | | | | |
| | | C7H (Connection Release - PDSN OAM&P intervention), | | | | | | |
| | | C8H (Connection Release - accounting error ) | | | | | | |
| | | CAH (Connection Release - user (NAI) | | | | | | |
| | | authentication failure)] | | | | | | |
| | ⇒ | SR_ID: A9 Element Identifier = [0BH] | | | | | | 1 |
| | | Length = [01H] | | | | | | 2 |
| Reserved = [0000 0] | | | | IS-2000 SR_ID = [001-011] | | | | 3 |
| | ⇒ | Mobile Identity (MEID): A9 Element Identifier = [0DH] | | | | | | 1 |
| | | Length = [08H] | | | | | | 2 |
| MEID Hex Digit 1 = [0H-FH] | | | | Odd/Even Indicator = '0' | Type of Identity = [001] (MEID) | | | 3 |
| MEID Hex Digit 3 = [0H-FH] | | | | MEID Hex Digit 2 = [0H-FH] | | | | 4 |
| MEID Hex Digit 5 = [0H-FH] | | | | MEID Hex Digit 4 = [0H-FH] | | | | 5 |
| MEID Hex Digit 7 = [0H-FH] | | | | MEID Hex Digit 6 = [0H-FH] | | | | 6 |
| MEID Hex Digit 9 = [0H-FH] | | | | MEID Hex Digit 8 = [0H-FH] | | | | 7 |
| MEID Hex Digit 11 = [0H-FH] | | | | MEID Hex Digit 10 = [0H-FH] | | | | 8 |
| MEID Hex Digit 13 = [0H-FH] | | | | MEID Hex Digit 12 = [0H-FH] | | | | 9 |
| Fill = [FH] | | | | MEID Hex Digit 14 = [0H-FH] | | | | 10 |

Likewise, the A9-Update-A8 can be variously embodied. The following table shows a bitmap layout for an A9-Update-A8 message.

| 7 | 6 | 5 | 4 | 3 | 2 | 1 | 0 | Octet |
|---|---|---|---|---|---|---|---|---|
| | 3.5.1 A9-Update-A8 | | | | | | | |
| colspan="8" | ⇒ A9 Message Type = [0EH] | | | | | | | 1 |
| | ⇒ Call Connection Reference: A9 Element Identifier = [3FH] | | | | | | | 1 |
| colspan="8" | Length = [08H] | | | | | | | 2 |
| (MSB) | colspan="7" | Market ID = <any value> | | | | | | | 3 |
| colspan="7" | | | | | | | (LSB) | 4 |
| (MSB) | colspan="7" | Generating Entity ID = <any value> | | | | | | | 5 |
| colspan="7" | | | | | | | (LSB) | 6 |
| (MSB) | colspan="7" | Call Connection Reference = <any value> | | | | | | | 7 |
| | | | | | | | | 8 |
| | | | | | | | | 9 |
| colspan="7" | | | | | | | (LSB) | 10 |
| | ⇒ Correlation ID: A9 Element Identifier = [13H] | | | | | | | 1 |
| colspan="8" | Length = [04H] | | | | | | | 2 |
| (MSB) | colspan="7" | Correlation Value = <any value> | | | | | | | 3 |
| | | | | | | | | 4 |
| | | | | | | | | 5 |
| colspan="7" | | | | | | | (LSB) | 6 |
| | ⇒ Mobile Identity (IMSI): A9 Element Identifier = [0DH] | | | | | | | 1 |
| colspan="8" | Length = [06H-08H] (10-15 digits) | | | | | | | 2 |
| colspan="4" | Identity Digit 1 = [0H-9H] (BCD) | | | | Odd/even Indicator = [1, 0] | | | Type of Identity = [110] (IMSI) | | | 3 |
| colspan="4" | Identity Digit 3 = [0H-9H] (BCD) | | | | colspan="4" | Identity Digit 2 = [0H-9H] (BCD) | | | | | 4 |
| colspan="8" | ... | | | | | | | | ... |
| colspan="4" | Identity Digit N + 1 = [0H-9H] (BCD) | | | | colspan="4" | Identity Digit N = [0H-9H] (BCD) | | | | | n |
| colspan="4" | Identity Digit N + 3 = [0H-9H] (BCD) (if odd number of digits) = [1111] (if even number of digits) | | | | colspan="4" | Identity Digit N + 2 = [0H-9H] (BCD) | | | | | n + 1 |
| | ⇒ Mobile Identity (ESN): A9 Element Identifier = [0DH] | | | | | | | 1 |
| colspan="8" | Length = [05H] | | | | | | | 2 |
| colspan="4" | Identity Digit 1 = [0000] | | | | Odd/even Indicator = [0] | | | Type of Identity = [101] (ESN) | | | 3 |
| (MSB) | colspan="7" | ESN = <any value> | | | | | | | 4 |
| | | | | | | | | 5 |
| | | | | | | | | 6 |
| colspan="7" | | | | | | | (LSB) | 7 |
| | ⇒ IS-2000 Service Configuration Record: A9 Element Identifier = [0EH] | | | | | | | 1 |
| colspan="8" | Bit-Exact Length-Octet Count = <variable> | | | | | | | 2 |
| colspan="5" | Reserved = [0000 0] | | | | | colspan="3" | Bit-Exact Length-Fill Bits = [000-111] | | | 3 |
| (MSB) | colspan="7" | IS-2000 Service Configuration Record Content = <any value> | | | | | | | 4 |
| colspan="8" | ... | | | | | | | | ... |
| Seventh Fill Bit- if needed = [0 (if used as a fill bit)] | Sixth Fill Bit- if needed = [0 (if used as a fill bit)] | Fifth Fill Bit- if needed = [0 (if used as a fill bit)] | Fourth Fill Bit- if needed = [0 (if used as a fill bit)] | Third Fill Bit- if needed = [0 (if used as a fill bit)] | Second Fill Bit- if needed = [0 (if used as a fill bit)] | First Fill Bit- if needed = [0 (if used as a fill bit)] | | k |
| | ⇒ Service Option: A9 Element Identifier =[03H] | | | | | | | 1 |
| colspan="8" | Service Option = | | | | | | | 2 |
| colspan="7" | [00 21H (3G High Speed Packet Data) 00 3CH (Link Layer Assisted Header Removal) 00 3DH (Link Layer Assisted RObust Header Compression)] | | | | | | | (LSB) | 3 |
| | ⇒ User Zone ID: A9 Element Identifier = [02H] | | | | | | | 1 |
| colspan="8" | Length = [02H] | | | | | | | 2 |
| (MSB) | colspan="7" | UZID = <any value> | | | | | | | 3 |
| colspan="7" | | | | | | | (LSB) | 4 |
| | ⇒ Quality of Service Parameters: A9 Element Identifier = [07H] | | | | | | | 1 |
| colspan="8" | Length = [01H] | | | | | | | 2 |
| colspan="4" | Reserved = [0000] | | | | colspan="4" | Non-Assured Mode Packet Priority = [0000-1101] | | | | | 3 |

-continued

| | | | | 3.5.1 A9-Update-A8 | | | | |
|---|---|---|---|---|---|---|---|---|
| 7 | 6 | 5 | 4 | 3 | 2 | 1 | 0 | Octet |
| | | | ⇒ | Cause: A9 Element Identifier = [04H] | | | | 1 |
| | | | | Length = [01H] | | | | 2 |
| Ext = [0] | | | | Cause Value = [17H (SDB successfully delivered), 19H (Power down from dormant state), 1AH (Authentication failure), 1BH (Capability update), 1CH (Update accounting: late traffic channel setup), 1EH (Update accounting: parameter change), 7BH (Session parameter update) 21H (Core network Congestion) 22H (Core network (AAA) Congestion) 23H (Core network (HA) Congestion) 24H (Core network (PDSN) Congestion) 25H (Core network (HSGW) Congestion)]] | | | | 3 |
| | | | ⇒ | RN-PDIT: A9 Element Identifier = [0FH] | | | | 1 |
| | | | | Length = [01H] | | | | 2 |
| | | | | RN-PDIT = [01H-FFH] | | | | 3 |
| | | | ⇒ | SR_ID: A9 Element Identifier = [0BH] | | | | 1 |
| | | | | Length =[01H] | | | | 2 |
| | | | Reserved = [0000 0] | | | IS-2000 SR_ID = [ 001-011] | | 3 |
| | | | ⇒ | Mobile Identity (MEID): A9 Element Identifier = [0DH] | | | | 1 |
| | | | | Length = [08H] | | | | 2 |
| | | MEID Hex Digit 1 = [0H-FH] | | Odd/Even Indicator = '0' | | Type of Identity = [001] (MEID) | | 3 |
| | | MEID Hex Digit 3 = [0H-FH] | | | MEID Hex Digit 2 = [0H-FH] | | | 4 |
| | | MEID Hex Digit 5 = [0H-FH] | | | MEID Hex Digit 4 = [0H-FH] | | | 5 |
| | | MEID Hex Digit 7 = [0H-FH] | | | MEID Hex Digit 6 = [0H-FH] | | | 6 |
| | | MEID Hex Digit 9 = [0H-FH] | | | MEID Hex Digit 8 = [0H-FH] | | | 7 |
| | | MEID Hex Digit 11 = [0H-FH] | | | MEID Hex Digit 10 = [0H-FH] | | | 8 |
| | | MEID Hex Digit 13 = [0H-FH] | | | MEID Hex Digit 12 = [0H-FH] | | | 9 |
| | | Fill = [FH] | | | MEID Hex Digit 14 = [0H-FH] | | | 10 |
| | | | ⇒ | A9 Indicators: A9 Element Identifier = [05H] | | | | 1 |
| | | | | Length = [01H] | | | | 2 |
| Reserved = [0] | Packet Boundary Supported = [0, 1] (ignored) | GRE Segment Supported = [0] | SDB Supported = [0, 1] | CCPD Mode = [0] (Ignored) | Reserved = [0] | Data Ready Indicator = [0] (Ignored) | Handoff Indicator = [0] (Ignored) | 3 |
| | | | ⇒ | PDSN Address: A9 Element Identifier = [14H] | | | | 1 |
| | | | | Length =[04H] | | | | 2 |
| (MSB) | | | | PDSN Address = <any value> | | | | 3 |
| | | | | | | | | 4 |
| | | | | | | | | 5 |
| | | | | | | | (LSB) | 6 |
| | | | ⇒ | Anchor PDSN Address: A9 Element Identifier = [30H] | | | | 1 |
| | | | | Length = [04H] | | | | 2 |
| (MSB) | | | | Anchor PDSN Address = <any value> | | | | 3 |
| | | | | | | | | 4 |
| | | | | | | | | 5 |
| | | | | | | | (LSB) | 6 |
| | | | ⇒ | Anchor P-P Address: A9 Element Identifier = [40H] | | | | 1 |
| | | | | Length = [04H] | | | | 2 |
| (MSB) | | | | Serving P-P IP Address = <any value> | | | | 3 |
| | | | | | | | | 4 |
| | | | | | | | | 5 |
| | | | | | | | (LSB) | 6 |

The cause element can be variously embodied. The following table shows an example bitmap layout for a cause element.

4.2.3 Cause

| 7 | 6 | 5 | 4 | 3 | 2 | 1 | 0 | Octet |
|---|---|---|---|---|---|---|---|---|
| | | A9 Element Identifier | | | | | | 1 |
| | | Length | | | | | | 2 |
| 0/1 | | Cause Value | | | | | | 3 |

The length field can indicate the number of octets in this element following the Length field. The cause value field can be a single octet field if the extension bit (bit 7) is set to '0'. If bit 7 of octet 3 is set to '1' then the cause value can be a two octet field. If the value of the first octet of the cause field is '1XXX 0000' then the second octet can be reserved for national applications, where 'XXX' indicates the Cause Class as indicated in the table below.

TABLE 4.2.3-1

| Cause Class | |
|---|---|
| Binary Values | Meaning |
| 000 | Normal event |
| 001 | Normal event |
| 010 | Resource unavailable |
| 011 | Service or option not available |
| 100 | Service or option not implemented |
| 101 | Invalid message (e.g., parameter out of range) |
| 110 | Protocol error |
| 111 | Interworking |

Moreover, there may be various cause values, as illustrated in the following table:

TABLE 4.2.3-2

| 6 | 5 | 4 | 3 | 2 | 1 | 0 | Hex Value | Cause |
|---|---|---|---|---|---|---|---|---|
| \multicolumn{9}{c}{Normal Event Class (000 xxxx and 001 xxxx)} |
| 0 | 0 | 0 | 0 | 1 | 1 | 1 | 07 | OAM&P intervention |
| 0 | 0 | 0 | 1 | 0 | 0 | 0 | 08 | MS busy |
| 0 | 0 | 0 | 1 | 0 | 1 | 1 | 0B | Handoff successful |
| 0 | 0 | 0 | 1 | 1 | 1 | 1 | 0F | Packet data session release |
| 0 | 0 | 1 | 0 | 0 | 0 | 0 | 10 | Packet call going dormant |
| 0 | 0 | 1 | 0 | 0 | 0 | 1 | 11 | Service option not available |
| 0 | 0 | 1 | 0 | 0 | 1 | 1 | 13 | Successful operation |
| 0 | 0 | 1 | 0 | 1 | 0 | 0 | 14 | Normal call release |
| 0 | 0 | 1 | 0 | 1 | 1 | 0 | 16 | Initiate re-activation of packet data call |
| 0 | 0 | 1 | 0 | 1 | 1 | 1 | 17 | SDB successfully delivered |
| 0 | 0 | 1 | 1 | 0 | 0 | 0 | 18 | SDB couldn't be delivered |
| 0 | 0 | 1 | 1 | 0 | 0 | 1 | 19 | Power down from dormant state |
| 0 | 0 | 1 | 1 | 0 | 1 | 0 | 1A | Authentication failure |
| 0 | 0 | 1 | 1 | 0 | 1 | 1 | 1B | Capability update |
| 0 | 0 | 1 | 1 | 1 | 0 | 0 | 1C | Update Accounting: late traffic channel setup |
| 0 | 0 | 1 | 1 | 1 | 0 | 1 | 1D | Hard handoff failure |
| 0 | 0 | 1 | 1 | 1 | 1 | 0 | 1E | Update Accounting: parameter change |
| \multicolumn{9}{c}{Resource Unavailable Class (010 xxxx)} |
| 0 | 1 | 0 | 0 | 0 | 0 | 0 | 20 | Equipment failure |
| 0 | 1 | 0 | 0 | 0 | 0 | 1 | 21 | Core Network Congestion |
| 0 | 1 | 0 | 0 | 0 | 1 | 0 | 22 | Core Network Congestion - AAA |
| 0 | 1 | 0 | 0 | 0 | 1 | 1 | 23 | Core Network Congestion - HA |
| 0 | 1 | 0 | 0 | 1 | 0 | 0 | 24 | Core Network Congestion - PDSN |
| 0 | 1 | 0 | 0 | 1 | 0 | 1 | 25 | Core Network Congestion - HSGW |
| \multicolumn{9}{c}{Service or Option Not Available Class (011 xxxx)} |
| 0 | 1 | 1 | 0 | 0 | 1 | 0 | 32 | PCF resources are not available |
| 0 | 1 | 1 | 0 | 1 | 1 | 0 | 36 | Session parameter/option not supported at BS |
| \multicolumn{9}{c}{Service or Option Not Implemented Class (100 xxxx)} |
| \multicolumn{9}{c}{Invalid Message Class (101 xxxx)} |
| \multicolumn{9}{c}{Protocol Error (110 xxxx)} |
| \multicolumn{9}{c}{Interworking (111 xxxx)} |
| 1 | 1 | 1 | 1 | 0 | 0 | 1 | 79 | PDSN resources are not available |
| 1 | 1 | 1 | 1 | 0 | 1 | 0 | 7A | Data ready to send |
| 1 | 1 | 1 | 1 | 0 | 1 | 1 | 7B | Session parameter update |
| \multicolumn{7}{c}{All other values} | | Reserved for future use. |

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
   identifying a cause of actual or potential congestion; and
   notifying a radio access network regarding the cause of actual or potential congestion, wherein the notifying comprises sending a message comprising a cause code, wherein the cause code is generic to a network elements or wherein the cause code is specific to a particular network element or category of network elements, the message being at least one of an A11-Notify message or an A11-Registration reply message.

2. The method of claim 1, wherein the actual or potential congestion is a core network element congestion.

3. A method, comprising:
   receiving a notification of a cause of actual or potential congestion; and
   taking action with respect to at least one session based on the notification, wherein the receiving comprises receiving a first message comprising a cause code, wherein the cause code is generic to a plurality of network elements or wherein the cause code is specific to a particular network element or category of network elements, the first message being at least one of an A11-Notify message or an A11-Registration reply message.

4. The method of claim 3, wherein actual or potential congestion is a core network congestion.

5. The method of claim 3, further comprising:
   transmitting the cause code and the action to be taken in a second message.

6. The method of claim 5, wherein the second message is an A9-Release-A8-Complete message or an A9-Disconnect-A8 message or an A9-Update-A8 message.

7. The method of claim 3, wherein the action is at least one of graceful A8 release and inter-PDSN-handover and ungraceful A8 release and rejecting a new session setup, and wherein the action depends on the cause of actual or potential congestion or on assigned priority values or both.

8. A method, comprising:
   receiving an identification of an action to be taken with respect to at least one session and a notification of a cause for the action, wherein the action is at least one of graceful A8 release, inter-PDSN-handover, ungraceful A8 release, or rejecting a new session setup.

9. The method of claim 8, wherein the cause of the action is an actual or potential core network congestion.

10. The method of claim 8, wherein the receiving comprises receiving a message comprising a cause code, wherein the cause code is generic to a plurality of network elements or wherein the cause code is specific to a particular network element or category of network elements.

11. The method of claim 10, wherein the message is an A9-Release-A8-Complete message or an A9-Disconnect-A8 message or an A9-Update-A8 message.

12. The method of claim 8, wherein the action depends on the cause of actual or potential congestion or on assigned priority values or both.

13. An apparatus, comprising:
    at least one processor; and
    at least one memory comprising computer program code,
    wherein the at least one memory and computer program code are configured to, with the at least one processor, cause the apparatus at least to
    identify a cause of actual or potential congestion; and
    notify a radio access network regarding the cause of actual or potential congestion, wherein the apparatus comprises a core network element and wherein the actual or potential congestion is a core network element congestion.

14. The apparatus of claim 13, wherein the at least one memory and computer program code are configured to, with the at least one processor, cause the apparatus at least to notify by sending a message comprising a cause code, wherein the cause code is generic to a plurality of network elements or wherein the cause code is specific to a particular network element or category of network elements.

15. The apparatus of claim 14, wherein the message is an A11-Notify message or an A11-Registration reply message.

16. An apparatus, comprising:
    at least one processor; and
    at least one memory comprising computer program code,
    wherein the at least one memory and computer program code are configured to, with the at least one processor, cause the apparatus at least to
    receive a notification of a cause of actual or potential congestion; and
    take action with respect to at least one session based on the notification, wherein actual or potential congestion is a core network congestion, and wherein the apparatus comprises a first radio access network element and wherein the first radio access network element is a packet control function.

17. The apparatus of claim 16, wherein the at least one memory and computer program code are configured to, with the at least one processor, cause the apparatus at least to receive a first message comprising a cause code, wherein the cause code is generic to a plurality of network elements or wherein the cause code is specific to a particular network element or category of network elements.

18. The apparatus of claim 17, wherein the first message is an A11-Notify message or an A11-Registration reply message.

19. The apparatus of claim 17, wherein the at least one memory and computer program code are configured to, with the at least one processor, cause the apparatus at least to transmit the cause code and the action to be taken in a second message to a second radio access network element.

20. The apparatus of claim 19, wherein the second message is an A9-Release-A8-Complete message or an A9-Disconnect-A8 message or an A9-Update-A8 message.

21. The apparatus of claim 16, wherein the action is at least one of graceful A8 release and inter-PDSN-handover and ungraceful A8 release and rejecting a new session setup, and wherein the action depends on the cause of actual or potential congestion or on assigned priority values or both.

22. An apparatus, comprising:
    at least one processor; and
    at least one memory comprising computer program code,
    wherein the at least one memory and computer program code are configured to, with the at least one processor, cause the apparatus at least to
    receive an identification of an action to be taken with respect to at least one session and a notification of a cause for the action, wherein the at least one memory and computer program code are configured to, with the at least one processor, cause the apparatus at least to receive a message comprising a cause code, wherein the cause code is generic to a plurality of network elements or wherein the cause code is specific to a particular network element or category of network elements and wherein the message is an A9-Release-A8-Complete message or an A9-Disconnect-A8 message or an A9-Update-A8 message.

23. The apparatus of claim 22, wherein the cause of the action is an actual or potential core network congestion, and wherein the apparatus comprises a radio access network element.

24. The apparatus of claim 23, wherein the radio access network element is an access terminal or a base station.

25. The apparatus of claim 22, wherein the action is at least one of graceful A8 release, inter-PDSN-handover, ungraceful A8 release, or rejecting a new session setup.

26. The apparatus of claim 22, wherein the action depends on the cause of actual or potential congestion or on assigned priority values or both.

\* \* \* \* \*